US012181971B1

United States Patent
Nemati et al.

(10) Patent No.: US 12,181,971 B1
(45) Date of Patent: Dec. 31, 2024

(54) SYMBOL ROTATION OF CACHE LINE CODEWORDS FOR INCREASED RELIABILITY WITH METADATA

(71) Applicant: MICROSOFT TECHNOLOGY LICENSING, LLC, Redmond, WA (US)

(72) Inventors: Majid Anaraki Nemati, San Diego, CA (US); Srikanth Dakshinamoorthy, Portland, OR (US); Anthony Dwayne Weathers, San Diego, CA (US); Ravinder Kumar, Morrisville, NC (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/336,850

(22) Filed: Jun. 16, 2023

(51) Int. Cl.
*G06F 11/10* (2006.01)
*G06F 12/0875* (2016.01)

(52) U.S. Cl.
CPC ...... *G06F 11/1096* (2013.01); *G06F 12/0875* (2013.01); *G06F 2212/1032* (2013.01)

(58) Field of Classification Search
CPC ............. G06F 11/1096; G06F 12/0875; G06F 2212/1032
See application file for complete search history.

(56) References Cited

U.S. PATENT DOCUMENTS

| | | |
|---|---|---|
| 2012/0278687 A1 | 11/2012 | Sharon |
| 2018/0046576 A1* | 2/2018 | Lesartre ............. G06F 12/0893 |
| 2019/0188074 A1* | 6/2019 | Coteus ................. G11C 29/52 |
| 2022/0000919 A1 | 3/2022 | Voigt |

OTHER PUBLICATIONS

International Search Report and Written Opinion received for PCT Application No. PCT/US2024/033475, Oct. 24, 2024, 14 pages.

* cited by examiner

*Primary Examiner* — Jigar P Patel
(74) *Attorney, Agent, or Firm* — Shook, Hardy & Bacon L.L.P.

(57) ABSTRACT

Embodiments generally relate to improving reliability of processing cache lines with metadata symbols encoded into parity symbols of codewords. The data and metadata of a cache line are encoded into codewords where each codeword is a number of (1) message symbols, each including message bits from data of the cache line, and (2) parity symbols, each including parity bits determined from the message symbols and a metadata symbol. For each codeword of the cache line, the plurality of message and parity symbols are rotated so that a location of each symbol of one codeword is different from other codewords of the cache line. The codewords of the cache line are then stored in memory as rotated. In this manner, the reliability is improved by rotating symbols of the codewords of the cache line, with metadata symbols encoded into parity of codewords, before storage in memory.

20 Claims, 13 Drawing Sheets

SYMBOL ROTATION OF CACHE LINE CODEWORDS FOR INCREASED RELIABILITY WITH METADATA

BACKGROUND

A cache line is a set of data that is stored in memory of a computer. Memory is small, but fast, and is used for storing frequently accessed data and/or instructions, so that a processor (for example, a central processing unit (CPU), a graphics processing unit (GPU), and the like) can quickly retrieve the data and/or instructions. Generally, a cache line is limited in size and is normally made up of several bytes of data (for example, often as few as 64 bytes or 512 bits). Typically, if a processor retrieves data and/or instructions, certain processors first check if the data and/or instructions is already in the memory to quickly retrieve the data and/or instructions from the cache line, which generally takes less time than accessing the data and/or instructions from storage. In this regard, metadata can be stored alongside the data of the cache line that it describes in order for the processor to check whether certain data and/or instructions are available in the memory. The metadata can include information about the cache line, such as validity of the cache line, whether the cache line was modified, other system information, and the like.

SUMMARY

Various aspects of the technology described herein are generally directed to systems, methods, and computer storage media for, among other things, improving reliability of processing cache lines with metadata symbols encoded into parity symbols of codewords of the cache lines by rotating symbols of the codewords of the cache line before storage in memory. Memory is small, but fast, and is used for storing frequently accessed data and/or instructions, so that a processor (for example, a central processing unit (CPU), a graphics processing unit (GPU), and the like) can quickly retrieve the data and/or instructions. In certain existing approaches, the data corresponding to a cache line that is being sent from or to a memory device includes metadata of the cache line, data of the cache line, and parity data for error correction codes (ECC) to detect and/or correct errors in the cache line. As access to memory is done based on the small size of data of the cache line (for example, the cache line can be 64 bytes) and is optimized to store the data and/or metadata consumed to execute instructions by the processor, in some existing approaches, to store additional metadata in memory, one method is to store the metadata physically in the media by replacing some bits from parity with metadata bits. The removal of parity bits deteriorates error correction capability of the ECC in forms of either increased uncorrectable error probability and/or increased miscorrection probability.

To resolve certain issues associated with existing error correction technology, embodiments of the present disclosure improve reliability of cache lines with metadata symbols encoded into parity symbols of codewords of the cache lines by rotating symbols of the codewords of the cache line before storage in memory. Data stored in memory regarding a cache line is made up of a number of codewords that are made up of a number of message symbols and parity symbols. The symbols of the codewords are often encoded in different memory devices of the memory. The message symbols include a number of message bits of the cache line, and the parity symbols are determined based on the message symbols of the codeword and metadata symbol(s) of the metadata of the cache line.

A memory controller determines the message symbols for the cache line from the data of the cache line. The memory controller determines the metadata symbols from the metadata of the cache line. The memory controller then determines the parity symbols for each codeword based on the metadata symbols and message symbols of each codeword. The memory controller then rotates the message and parity symbols of each codeword, omits the metadata symbols of each codeword, and stores the rotated message and parity symbols of each codeword in memory.

When the data of the cache line and/or metadata for the cache line is accessed, the memory controller accesses the rotated message and parity symbols from memory and uses an ECC algorithm to obtain the metadata symbols and/or correct errors in the message symbols based on parity symbols in the rotation of the message and parity symbols of the codewords. In this regard, errors caused by a memory device will not appear on the same symbol of every codeword and there is a higher probability of detecting and/or correcting errors caused by the memory device. In this manner, the reliability is improved by rotating symbols of the codewords of the cache line, with metadata bits/information encoded into parity of codewords, before storage in memory. Accordingly, embodiments of the present disclosure improve reliability of data storage and retrieval to avoid impacts to other systems and services in a distributed or local environment, thereby improving a user experience and reducing computational resource consumption associated with further remedying error correction shortcoming in the current technology landscape.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Figure 1A:
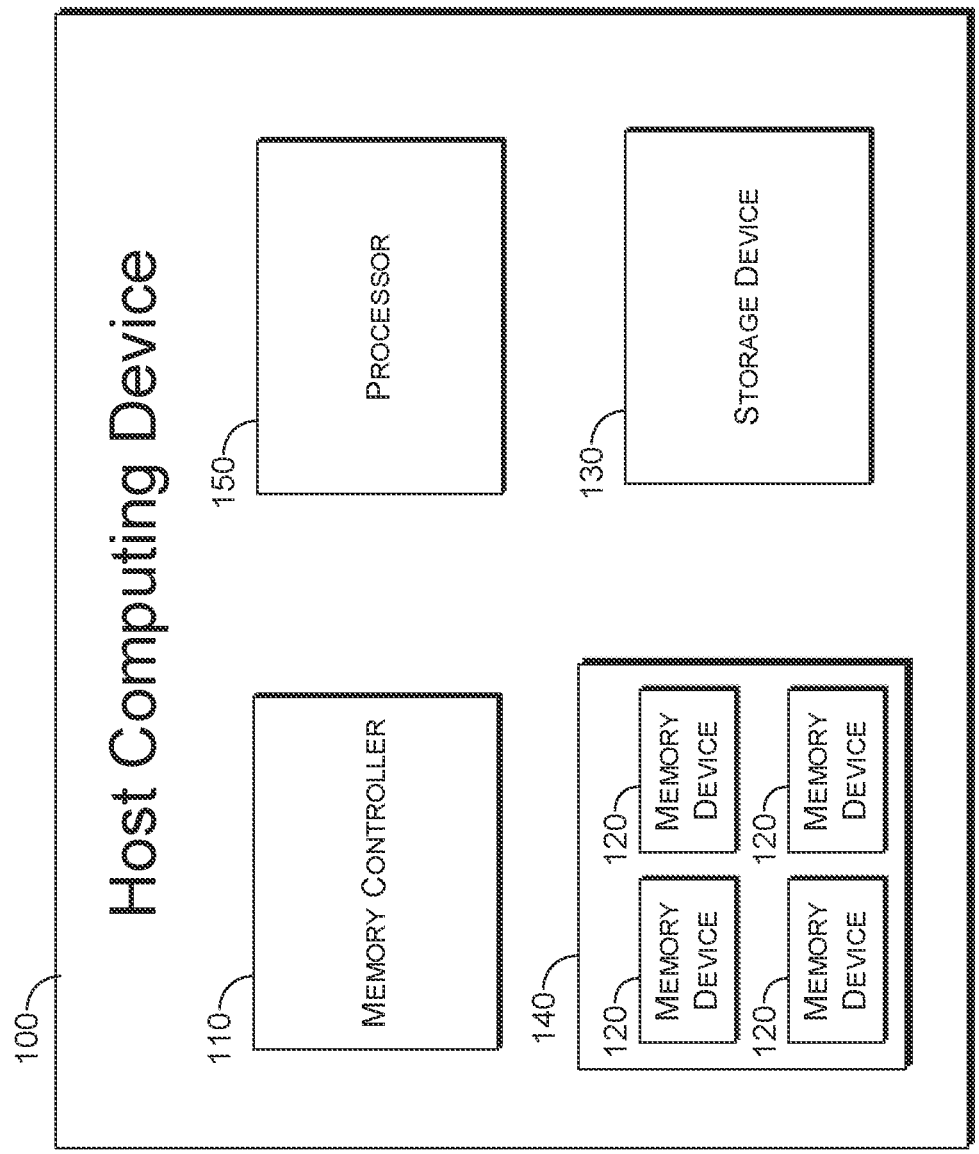
FIG. 1A depicts a block diagram of an example host computing device configured to programmatically rotate symbols of codewords of cache lines, in accordance with aspects of the technology described herein.

The subject matter of aspects of the present disclosure is described with specificity herein to meet statutory requirements. However, the description itself is not intended to limit the scope of this patent. Rather, it is contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Overview of Technical Problems, Technical Solutions, and Technological Improvements Memory (for example, including Double Data Rate 5 Synchronous Dynamic Random-Access Memory (DDR5 SDRAM), Double Data Rate Type 6 (DDR6), dynamic random access memory (DRAM), DRAM of a solid-state drive (SSD), or any type of memory) is typically very small and is optimized to store the data and/or metadata of cache lines necessary to execute instructions by the processor. In certain existing approaches, the data corresponding to a cache line that is being sent from or to a memory device includes metadata of the cache line, data of the cache line, and parity data for error correction codes (ECC) to detect and/or correct errors in the cache line. In this regard, the cache line is made up of a number of codewords of ECC, which include metadata bits for the metadata of the cache line, data bits for data of the cache line, and parity data bits for the parity generated by ECC.

In one example of ECC, a codeword is a sequence of bits that has been encoded using an error-correcting code. The general purpose of the codeword is to allow for detection and correction of errors that may occur during data transmission or storage. In some embodiments, the process of generating a codeword involves adding redundancy to the original data by introducing additional bits into the sequence (for example, parity bits). In one embodiment, these additional bits are derived from the original data using a specific encoding algorithm that depends on the particular ECC algorithm being utilized. When the codeword is transmitted or stored, the codeword can be subjected to various types of errors, such as bit flips, noise, or interference. In one embodiment, ECC algorithms are designed to detect these errors and correct them based on the parity bits of the received codeword. The size of certain codeword depends on the specific ECC algorithm and the number of errors that are detected and corrected. In general, the longer the codeword (for example, the more parity bits included in the codeword), the more errors that can be detected and corrected. However, longer codewords have extra bits, and as such, consume more bandwidth for transmission over a network or storage space when storing the codewords in memory. Due to the increase in size of the codewords, the codewords can also have higher processing resource utilization than acceptable to avoid interrupting other services hosted by similar servers.

As access to memory is done based on the small size of data of the cache line (for example, the cache line can be 64 bytes) and is optimized to store the data and/or metadata consumed to execute instructions by the processor, in some existing approaches, to store additional metadata in memory, one method is to store the metadata physically in the media by replacing some bits from parity with metadata bits. However, such modification deteriorates error correction capability of the ECC in forms of either increased uncorrectable error probability and/or increased miscorrection probability. For example, if the ECC identifies the wrong bit as causing the error (for example, because the parity was replaced by metadata), the ECC may correct the wrong bit (for example, miscorrection). In some cases, the miscorrection will lead to silent data corruption (SDC). SDC refers to the phenomenon where corrupted data is not accompanied by identified errors, which can lead to costly problems.

Figure 1B:
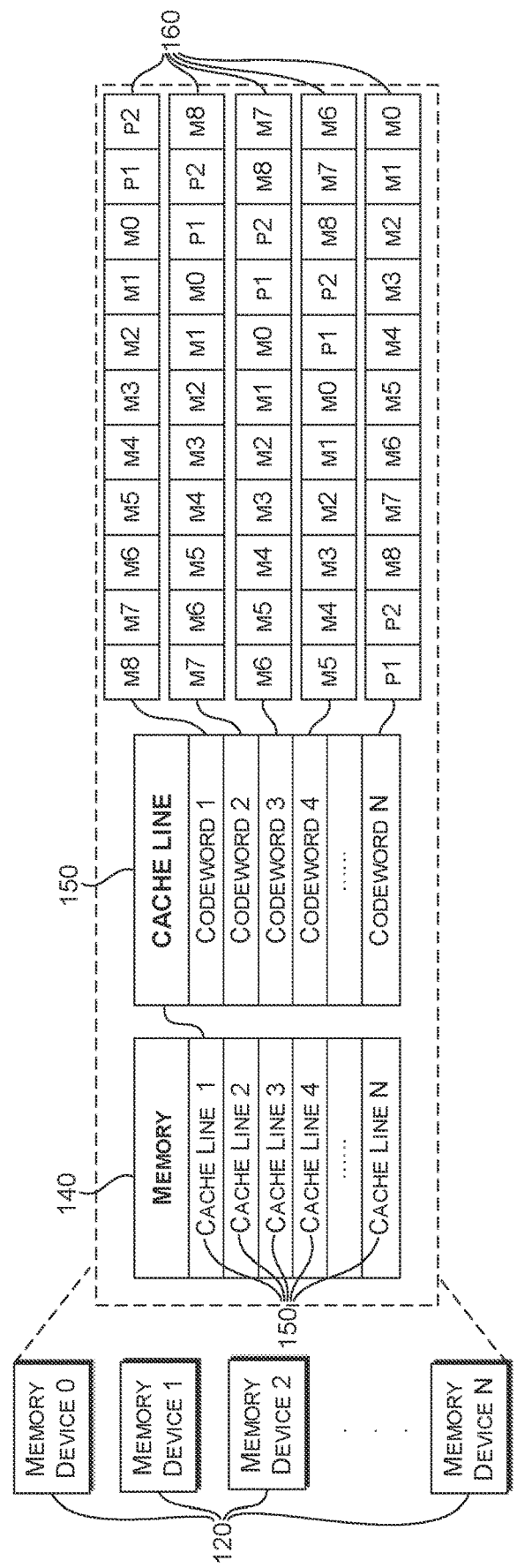
FIG. 1B depicts a block diagram of an example of memory devices of the host computing device of FIG. 1A, in accordance with aspects of the technology described herein.
Figure 1C:
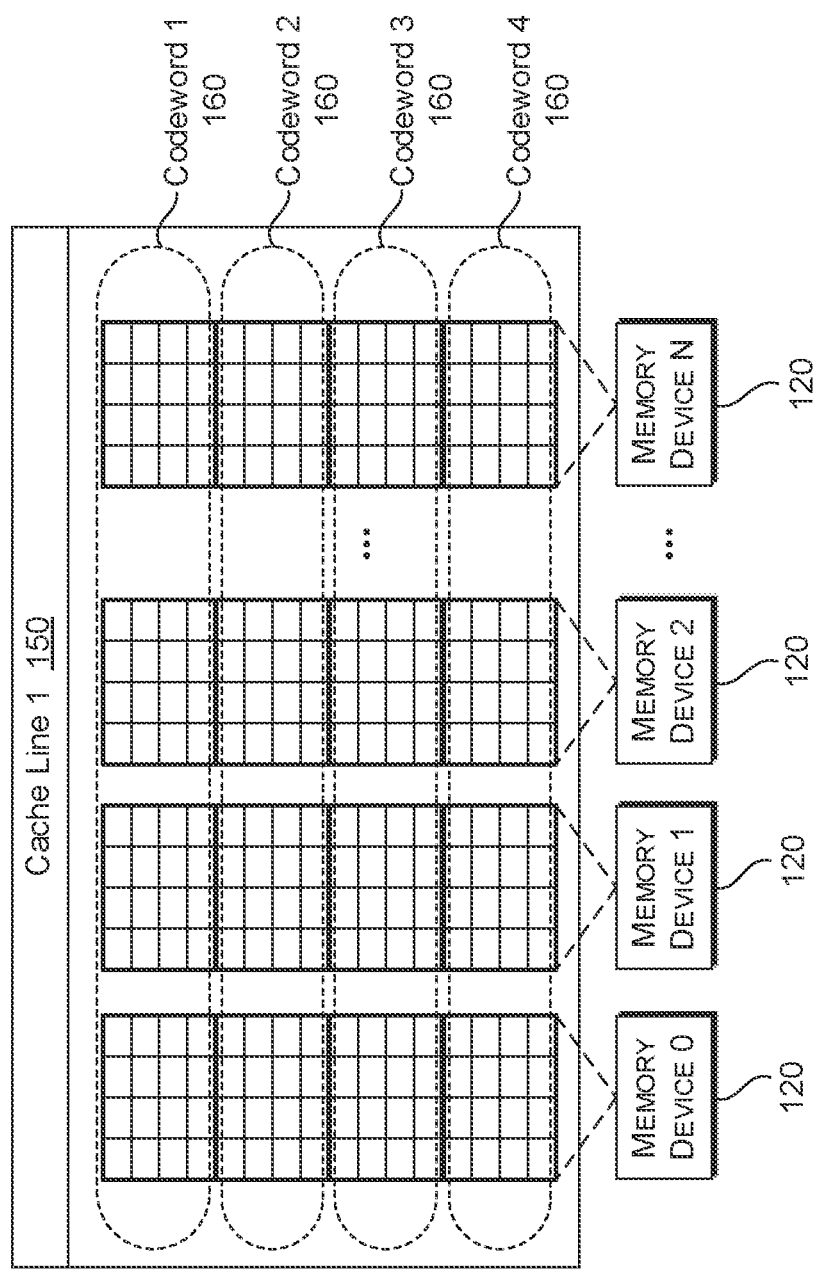
FIG. 1C depicts another block diagram of an example of memory devices of the host computing device of FIG. 1A, in accordance with aspects of the technology described herein.
Figure 1D:
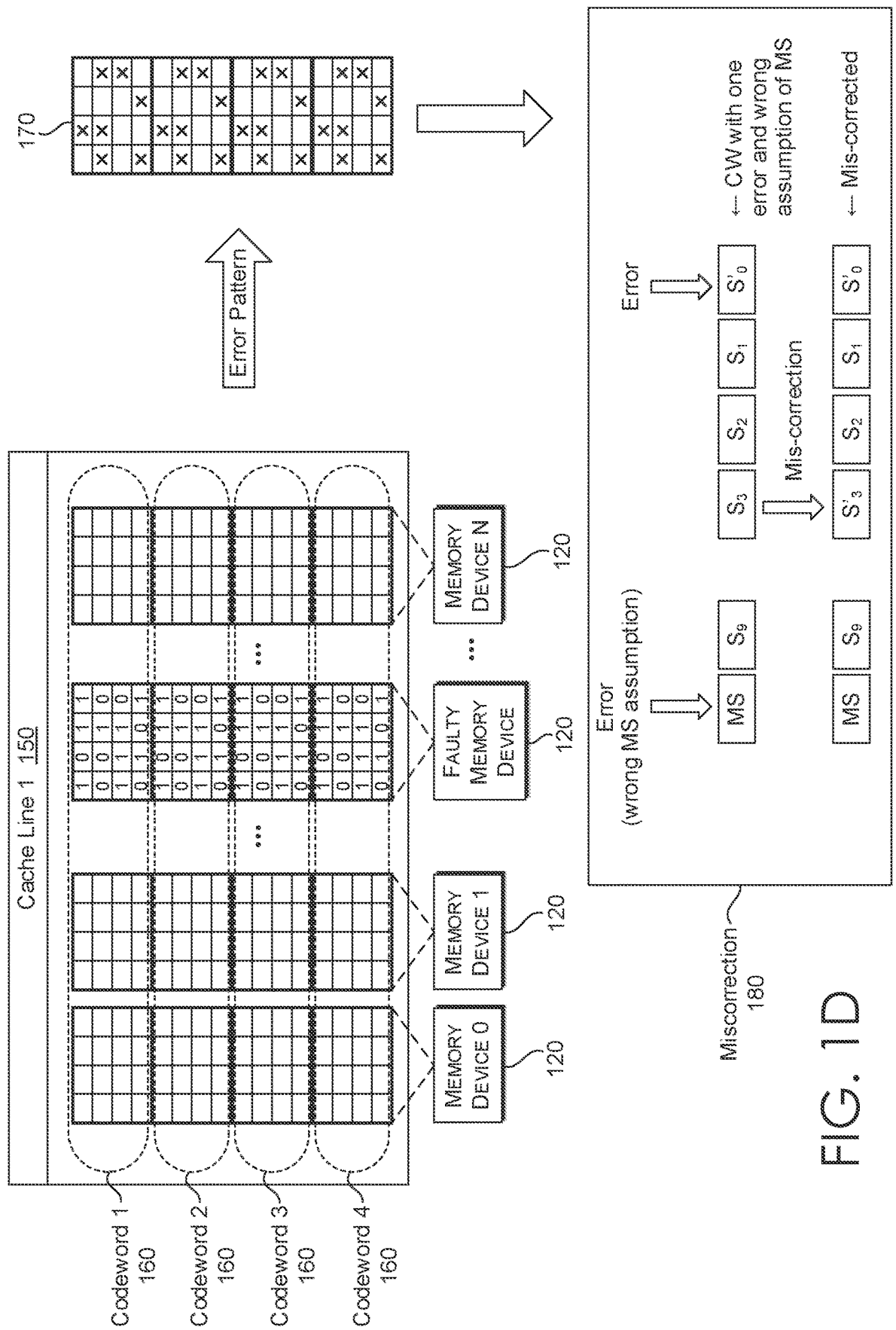
FIG. 1D depicts a block diagram of an example of memory devices of the host computing device of FIG. 1A when symbols of codewords of cache lines are not rotated.

In some cases, increased uncorrectable errors, increased miscorrections, and/or SDC may be due to a failure of a memory device (for example, as shown in FIG. 1D). Conventional techniques are often utilized to minimize errors from failed memory devices within the overall memory device. For example, DRAM is made up of a number of DRAM devices (for example, chips) in various configurations (for example, 288-pin Dual In-Line Memory Module (DIMM) for DDR5 SDRAM). In this example, when a single DRAM device fails in the DRAM, algorithms (for example, ChipKill) can either correct errors produced by the failed DRAM device or use a different DRAM device instead of the failed DRAM device. However, under conventional techniques, when parity of codewords are of a cache line are replaced by metadata, the errors produced by failed DRAM devices may be missed or miscorrected.

In this regard, embodiments of the present disclosure include improving reliability of processing cache lines with metadata symbols encoded into parity symbols of codewords of the cache lines by rotating symbols of the codewords of the cache line before storage in memory.

At a high level, data corresponding to a cache line stored in memory is made up of a number of codewords and each of the codewords are made up of a number of message symbols and parity symbols. The message symbols are made up of a number of message bits of the cache line and the parity symbols are determined based on the message symbols of the codeword and metadata symbol(s) to be encoded into the codeword. As an example, and with reference to FIG. 1C, the cache line is made up of four (4) codewords (for example, codewords 160). Four (4) codewords are shown as an example and any number of codewords of a cache line are contemplated, such as one, two, three, five, eight, ten, and the like. In some embodiments, each of the codewords include symbols made up of a number of data pins on a number of memory devices. In one example, a data pin is identified as a "DQ." In some embodiments, each of the data pins correspond to a bit of data stored on the memory device. In the example shown in FIG. 1C, the symbols of each codeword 160 includes 4 DQs on each device and there are N number of devices 120 (for example, memory device 0, memory device 1, memory device 2, and memory device N).

In conventional implementations, symbols of each device correspond to specific type of symbol. For example, referring to FIG. 1C, each symbol of one or more memory devices would correspond to message symbols made up of message bits, and each symbol of one or more other memory devices would correspond to parity symbols made up of parity bits. However, when parity bits in parity symbols are replaced with metadata bits, error correction capabilities are diminished, which can lead to uncorrectable or miscorrection of errors (for example, miscorrection 180 of FIG. 1D).

Instead, embodiments of the present disclosure improve reliability of processing cache lines with metadata symbols encoded into parity symbols of codewords of the cache lines by rotating symbols of the codewords of the cache line before storage in memory. As an example, and with reference to FIG. 3, data for a cache line and metadata for the cache line (for example, data 302 and metadata 304) are accessed by a memory controller (for example, memory controller 312, a cache controller, an application in communication with a memory/cache controller, and the like). In one embodiment, the memory controller determines the message symbols for the cache line from the data of the cache line (for example, message data encoder engine 316). In the example discussed with respect to FIG. 1C, each message symbol corresponds to the number of message bits stored on each device for each codeword.

In one embodiment, the memory controller determines the metadata symbols for the cache line from the metadata for the cache line (for example, metadata encoder engine 318). In some embodiments, the metadata symbol is shared by some or all codewords of the cache line bits to create dependency between the metadata symbols of each codeword. In some embodiments, the metadata symbol is different for each codeword of the cache line. In embodiments where the metadata symbol is different for each codeword of the cache line, the metadata symbols for some or all of the codewords of the cache line may share one or more metadata bits to create dependency between the metadata symbols of each codeword.

In one embodiment, the memory controller then determines the parity symbols for each codeword based on the metadata symbols and message symbols of each codeword (for example, error correction code encoder engine 320). An ECC algorithm can be used to generate the parity symbols. For example, the memory controller employs Reed-Solomon (RS) codes as the ECC algorithm. In the example shown in FIG. 3, the parity symbols can be generated by an RS (11,9) code. Any type of ECC algorithm is within the scope of embodiments of the present disclosure, in addition or alternative to RS codes.

In one embodiment, the memory controller then omits the metadata symbols of each codeword, rotates the message and parity symbols of each codeword (for example, rotation encoder engine 322), and stores the rotated message and parity symbols of each codeword in memory (for example, memory 306). In this regard, as can be understood with reference to the memory locations discussed with reference to FIG. 1C, the message symbols and parity symbols of each codeword for the cache line are not stored on the same memory device in memory. For example, with reference to FIG. 3, symbol location S0, which stores parity symbol p2 will store parity symbol p2 for codeword 1, message symbol m8 for codeword 2, message symbol m7 for codeword 3, and message symbol m6 for codeword 4. Although a rotation of each codeword by an increasing number of symbols (for example, the first/top codeword of rotation encoder engine 322 is rotated by 0 symbols, the second codeword is rotated of rotation encoder engine 322 is rotated by 1 symbol, the third codeword is rotated of rotation encoder engine 322 is rotated by 2 symbols, and the fourth/bottom codeword is rotated of rotation encoder engine 322 is rotated by 3 symbols), a rotation by any number of symbols for any number of codewords are within the scope of embodiments of the present disclosure.

Normally, certain codewords generated by RS codes are cyclic at the symbol level in that if symbols of a codeword are cyclically shifted, the resulting codeword is also a valid codeword of the same RS code. As such, the rotation of any fault pattern, will be another fault pattern with the same property, which may result in a miscorrection of an error or an uncorrectable error. However, as the metadata symbol used to generate the codeword is omitted from the codeword before cyclically shifting code word (for example, rotation encoder engine 322 of FIG. 3), the codeword without metadata symbols is noncyclic and less likely to be a valid codeword as rotated. In this regard, the fault patterns causing decoding failure will have different properties with different rotations because metadata symbol is not written in the memory, but used to generate the ECC codeword from the same location. Therefore, the rotation of any fault pattern on any symbol will have a different effect compared to unrotated pattern.

In some embodiments, when the data of the cache line and/or metadata for the cache line is accessed, the memory controller accesses the rotated message and parity symbols from memory and uses the ECC algorithm to obtain the metadata symbols and/or correct errors in the message/metadata symbols based on parity symbols in the rotation of the message and parity symbols of the codewords. For example, with reference to FIG. 4, the memory controller (for example, memory controller 412, memory controller 312, a cache controller, an application in communication with a memory/cache controller, and so forth) accesses the data of the cache line as stored in memory (for example, memory 406). In one example, data corresponding to a cache line is stored as a number of codewords with rotated symbols as discussed with reference to FIG. 3. In the example shown in FIG. 4, there are four (4) codewords, however, any number of codewords for any number of cache lines are with the scope of embodiments of the present disclosure. In one example, the memory controller then determines the corresponding unrotated codewords (for example, rotation decoder engine 432). The determination of the corresponding unrotated codewords can be based on stored relationships accessible by the memory controller. For example, the memory controller can store the number of symbols that each codeword is rotated by.

In some embodiments, the memory controller uses the ECC algorithm to obtain the metadata symbols and/or correct errors in the message/metadata symbols based on parity symbols in the rotation of the message and parity symbols of the codewords (for example, error correction code decoder engine 430). In this regard, certain metadata bits of each metadata symbols are either a 1 or 0, such that the memory controller can use the ECC algorithm and parity symbols to determine each metadata bit of each metadata symbol. Further, the memory controller can use the ECC algorithm to correct errors detected in message bits of a codeword based on the parity symbols. Even further, when there are dependencies between metadata symbols in each of the codewords (for example, shared metadata bits and/or symbols between metadata symbols of some or all of the codewords), the memory controller can determine the metadata symbols and/or correct any errors based on a maximum likelihood of the metadata symbol being correct or the maximum likelihood of error correction as determined from any errors (or lack of errors) detected in each codewords of the cache line.

The memory controller can then access the metadata (for example, metadata 404) based on the decoded metadata symbols (for example, metadata decoder engine 428). The memory controller can also access the data of the cache line (for example, data 402) based on the decoded (and possible error-corrected) message symbols (for example, message data decoder engine 426).

Advantageously, the reliability of memory is improved by rotating symbols of the codewords of the cache line, with metadata symbols encoded into parity of codewords, before storage in memory. In this manner, there is a higher probability of detecting and/or correcting errors caused by a memory device due to the rotating of symbols of the codewords of the cache line. Accordingly, embodiments of the present disclosure improve reliability of data storage and data retrieval to avoid impacts to other systems and services in a distributed or local environment, thereby improving a user experience and reducing computational resource consumption associated with further remedying error correction shortcoming in the current technology landscape. Further, as the capacity of memory is increased by encoding metadata symbols into codewords without having to store the metadata symbols in memory, computing resources, such as storage space in memory, are reduced and networking resources, such as bandwidth for transmission if the data is transmitted over a network, is reduced.

Additional Description of Embodiments

Aspects of the technical solution can be described by way of examples and with reference to the figures. FIG. 1A illustrates an example host computing device 100 having a memory controller 110, memory 140 with any number of memory devices 120, processor 150, and a storage device 130 (for example, storage device can be made up of a number of storage devices, such as not-and (NAND) flash devices of an SSD or any type of storage device).

In some embodiments, the host computing device 100 is modular such that its components can be replaced by other components, can be removed, and/or other components can be added. Additionally, the host computing device 100, or components of the host computing device, can be communicatively coupled to other host computing devices, or additional other components of the host computing device, to scale and distribute workloads.

Embodiments of the memory controller 110 communicatively, electronically, and programmatically couple the components of the host computing device 100, such as the illustrated memory 140 with memory devices 120, storage device 130, and processor 150. An example host computing device 100 includes the computing device 1000 and/or associated components of FIG. 10. In one embodiment, the memory controller 110 is an embedded processor that executes firmware-level code to perform any number of functions. For example, the memory controller 110 performs bad block mapping, read and write caching, encryption, crypto-shredding, error detection and correction (for example, via error correcting code [ECC] such as Bose-Chaudhuri-Hocquenghem (BCH) code or RS code), garbage collection, read scrubbing management, read disturb management, and wear leveling, to name a few.

In one example, memory devices 120 of memory 140 refer to a random-access semiconductor memory that stores each bit of data in a memory cell, usually consisting of a small capacitor and a transistor. An example memory 140 with memory devices 120 includes the memory 1012 and/or associated components of FIG. 10. In some embodiments, memory devices 120 accesses data, generally in less than 10 microseconds, and is used to accelerate applications that would otherwise be held back by the latency of flash SSDs or traditional hard disk drives (HDDs). In some embodiments, memory 140 is DRAM, and memory devices 120 are DRAM devices used as the main memory (colloquially called the random-access memory "RAM") in certain computers and graphics cards (where the "main memory" is referred to as the graphics memory). Memory devices 120 can also be used in many portable devices and video game consoles. In some embodiments, memory devices 120 incorporate either an internal battery or an external AC/DC adapter and backup storage system to ensure data persistence while no power is being supplied to the drive from external sources. For example, if power is lost, the battery provides power while all information is copied from random access memory (RAM) to backup storage, such as storage device 130. When the power is restored, the information is copied back to the RAM from the backup storage, and the host computing device 100 resumes normal operation (similar to the hibernate function used in modern operating systems).

In some embodiments, storage device 130, or storage devices of storage device 130, includes a non-volatile flash memory that can hold data even when it's not connected to a power source. In some embodiments, the storage device 130, or storage devices of storage device 130, includes a metal-oxide-semiconductor (MOS) integrated circuit chip that includes non-volatile floating-gate memory cells.

With reference to FIG. 1B, FIG. 1B includes an example of memory made up of memory devices 120, in accordance with aspects of the technology described herein. FIG. 1B includes components that correspond to components described with reference to FIG. 1A. For example, the memory devices 120 of FIG. 1B correspond to the memory devices 120 depicted in FIG. 1A.

As illustrated, memory 140 is made up of the memory devices 120 of FIG. 1B, which are accessible by memory controller 110 of FIG. 1A to perform computer operations associated with memory storage functions, such as read and write operations. The memory 140 is made up of a number of cache lines 150 and each of the cache lines 150 are made up of a number codewords 160. The codewords of each cache line include a number of message symbols (for example, m1-m8) and parity symbols (p1, p2).

With reference to FIG. 1C, FIG. 1C includes an example cache line 150 made up of a number of codewords 160 as stored in symbol locations of memory devices 120, in accordance with aspects of the technology described herein. FIG. 1C includes components that correspond to components described with reference to FIGS. 1A and 1B. For example, the memory devices 120 of FIGS. 1A and 1B correspond to the memory devices 120 depicted in FIGS. 1A and 1B.

As illustrated, data corresponding to a cache line stored in memory is made up of a number of codewords 160 and each of the codewords are made up of a number of message symbols and parity symbols (for example as shown in FIG. 1B). The message symbols are made up of a number of message bits of the data of the cache line and the parity symbols are determined based on the message symbols of the codeword and metadata symbol(s) to be encoded into the codeword. With reference to FIG. 1C, the cache line is made up of four (4) codewords (for example, codewords 160). Four (4) codewords are shown as an example and any number of codewords of a cache line are contemplated. Each of the codewords include symbols made up of a number of DQs on a number of memory devices and each DQ corresponds to a bit of data stored on the memory device. In the example shown in FIG. 1C, each symbol of each codeword 160 includes 4 DQs on each device and there are N number of memory devices 120 (for example, memory device 0, memory device 1, memory device 2 and memory device N).

With reference to FIG. 1D, FIG. 1D includes an example of a miscorrection 180 of an error pattern 170 of cache line 150 due to unrotated codewords 160 as stored in symbol location of memory devices 120. FIG. 1D includes components that correspond to components described with reference to FIGS. 1A-C, except that the symbols of the codewords are not rotated (for example, as opposed to rotated codewords 160 of FIG. 1B). For example, the memory devices 120 of FIGS. 1A-C correspond to the memory devices 120 depicted in FIGS. 1A-C, except that the symbols of the codewords are not rotated (for example, as opposed to rotated codewords 160 of FIG. 1B).

In conventional implementations, symbols of each device correspond to specific type of symbol. For example, referring to FIG. 1C, each symbol of memory device 1 would correspond to message symbols made up of message bits (for example, m1 of error correction code encoder engine 320 of FIG. 3), and each symbol of memory device 2 would correspond to parity symbols made up of parity bits (for example, p1 of error correction code encoder engine 320 of FIG. 3). However, when bits in parity symbols are replaced with metadata bits, error correction capabilities are diminished, which can lead to uncorrectable or miscorrection of errors (for example, miscorrection 180 of FIG. 1D).

As illustrated in FIG. 1D, a faulty memory device of memory devices 120 produces an error pattern 170 on the same symbol of all codewords as faulty memory device of memory devices 120 corresponds to the same symbol in storage. For example, faulty memory device of memory devices 120 may always store parity symbol p1 for each codeword of the cache line. Thus, the error pattern will appear on parity symbol p1 for each codeword of the cache line. As the error pattern is repeated for all codewords of the cache line, the probability of the cache line being undecodable/uncorrectable or may result in a miscorrection 180 is increased.

Figure 3:
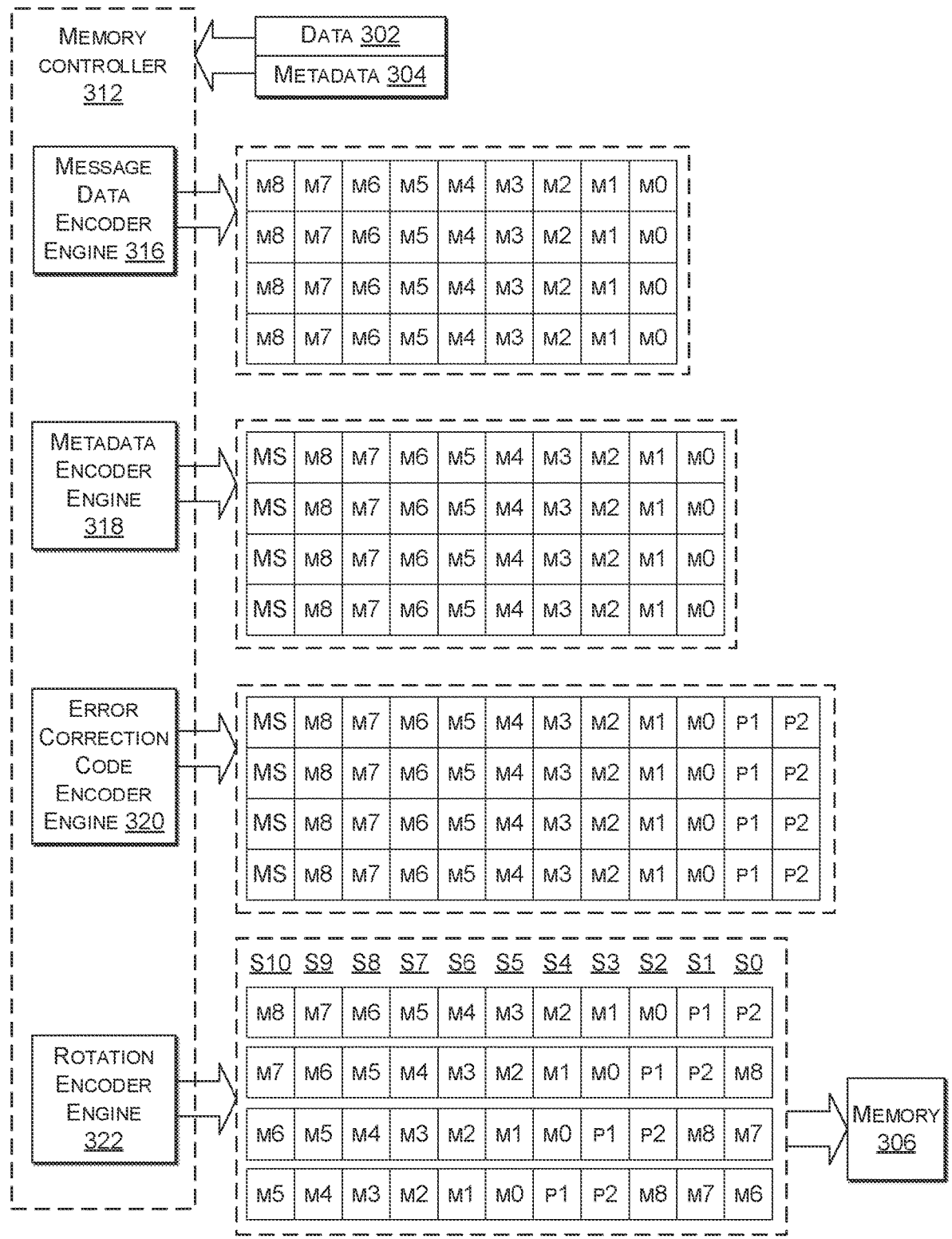
FIG. 3 depicts a block diagram of an example cache line codeword rotation encoding system to programmatically rotate symbols of codewords of cache lines, in accordance with aspects of the technology described herein.

As further illustrated in FIG. 1D, as a more specific example of a miscorrection 180, assuming (1) metadata symbols are used to encode parity symbols (for example, an example of which is shown by error correction code encoder engine 320 in FIGS. 3) and (2) the metadata symbols are omitted before being stored in memory, but without rotating the symbols of codewords of the cache lines, then parity symbol (for example, symbols $S'_0$ and $S'_1$) may decode the incorrect metadata symbol (for example, symbol MS) based on the parity symbols and can miscorrect a message bit symbol (for example, symbols $S'_3$) due to the incorrect metadata symbol. However, the rotation of symbols of codewords as shown in FIG. 1B can greatly reduce the possibility of this error. In this regard, the rotation of symbols of codewords as shown in FIG. 1B, increases the capacity of data stored in memory for the cache line by encoding metadata into parity symbols of codewords while increasing the reliability of error detection and correction capability.

It should be understood that many components have been omitted from FIGS. 1A-D for the sake of simplicity and to facilitate discussion. Accordingly, embodiments of the host computing device 100 are not limited only to those components illustrated or discussed herein. Indeed, it should be understood that any suitable components may be employed in addition or alternative to those components illustrated in FIGS. 1A-D, which may be replaced by any other suitable components.

Figure 2:
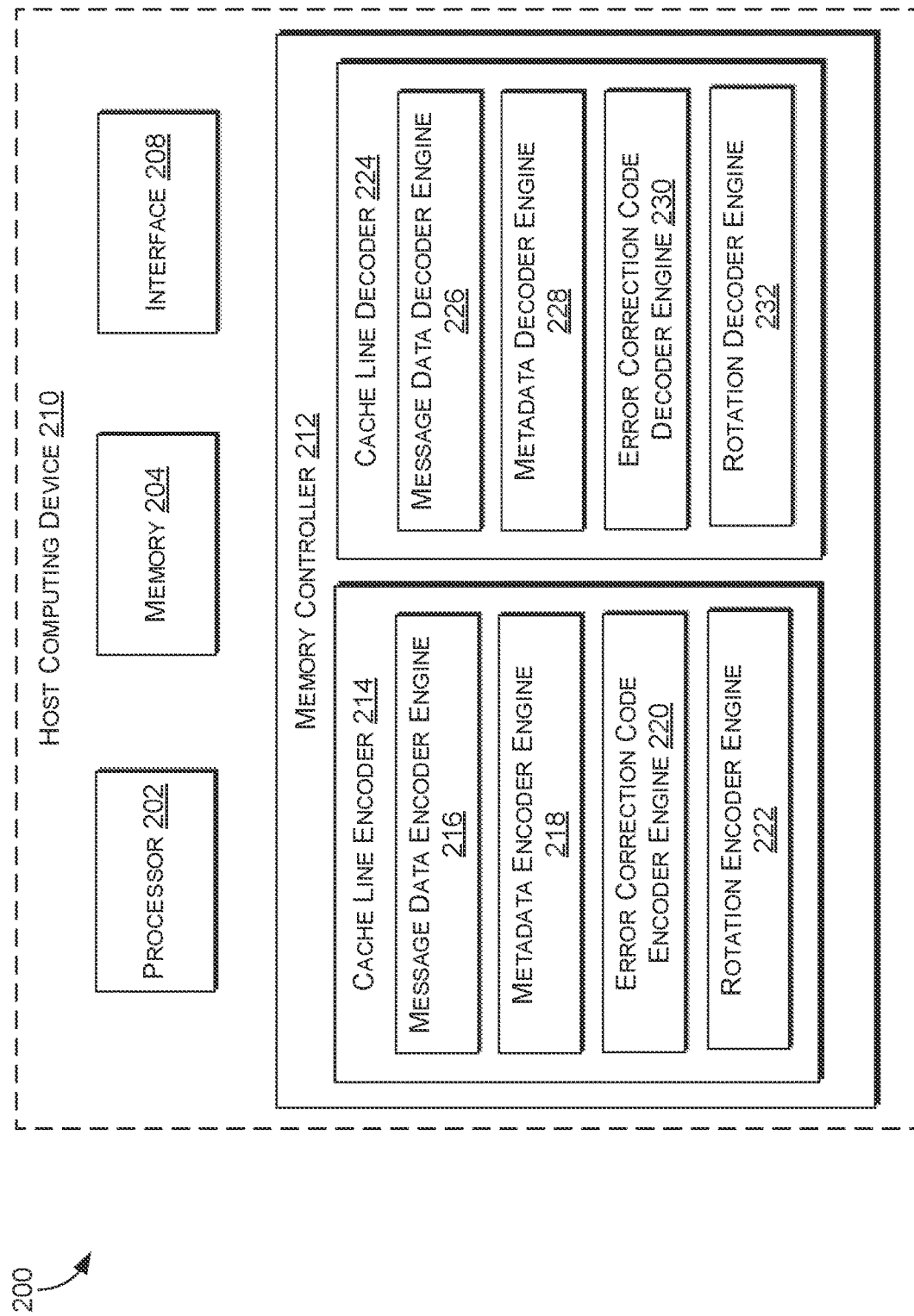
FIG. 2 depicts a block diagram of an example cache line codeword rotation system to programmatically rotate symbols of codewords of cache lines, in accordance with aspects of the technology described herein.
Figure 4:
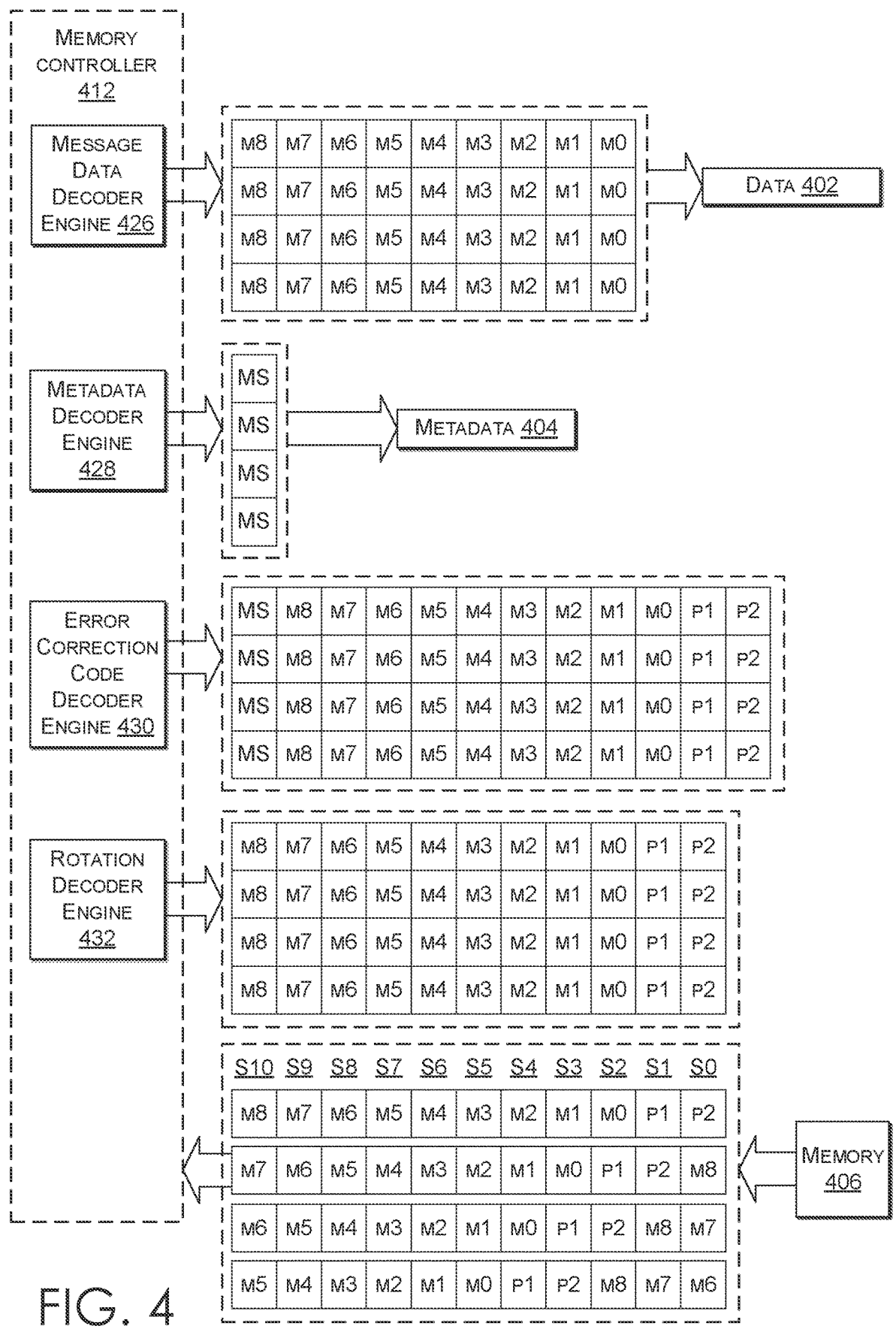
FIG. 4 depicts a block diagram of an example cache line codeword rotation decoding system to programmatically decode codewords of cache lines with rotated symbols, in accordance with aspects of the technology described herein.

Aspects of the technical solution can be described by way of examples and with reference to FIGS. 2 through 5C. FIG. 2 is an example cache line codeword rotation system 200 to programmatically rotate symbols of codewords of cache lines, in accordance with aspects of the technology described herein. This example environment is further described with reference to FIGS. 9 and 10, for example, for use in implementing embodiments of the technical solution are shown. Generally, the technical solution environment includes a technical solution system suitable for providing the example cache line codeword rotation system 200, which can employ methods of the present disclosure. Embodiments of the cache line codeword rotation system 200 are performed by the host computing device 210, the memory controller 110 (FIG. 1A), memory controller 312 (FIG. 3), or memory controller 412 (FIG. 4).

Figure 9:
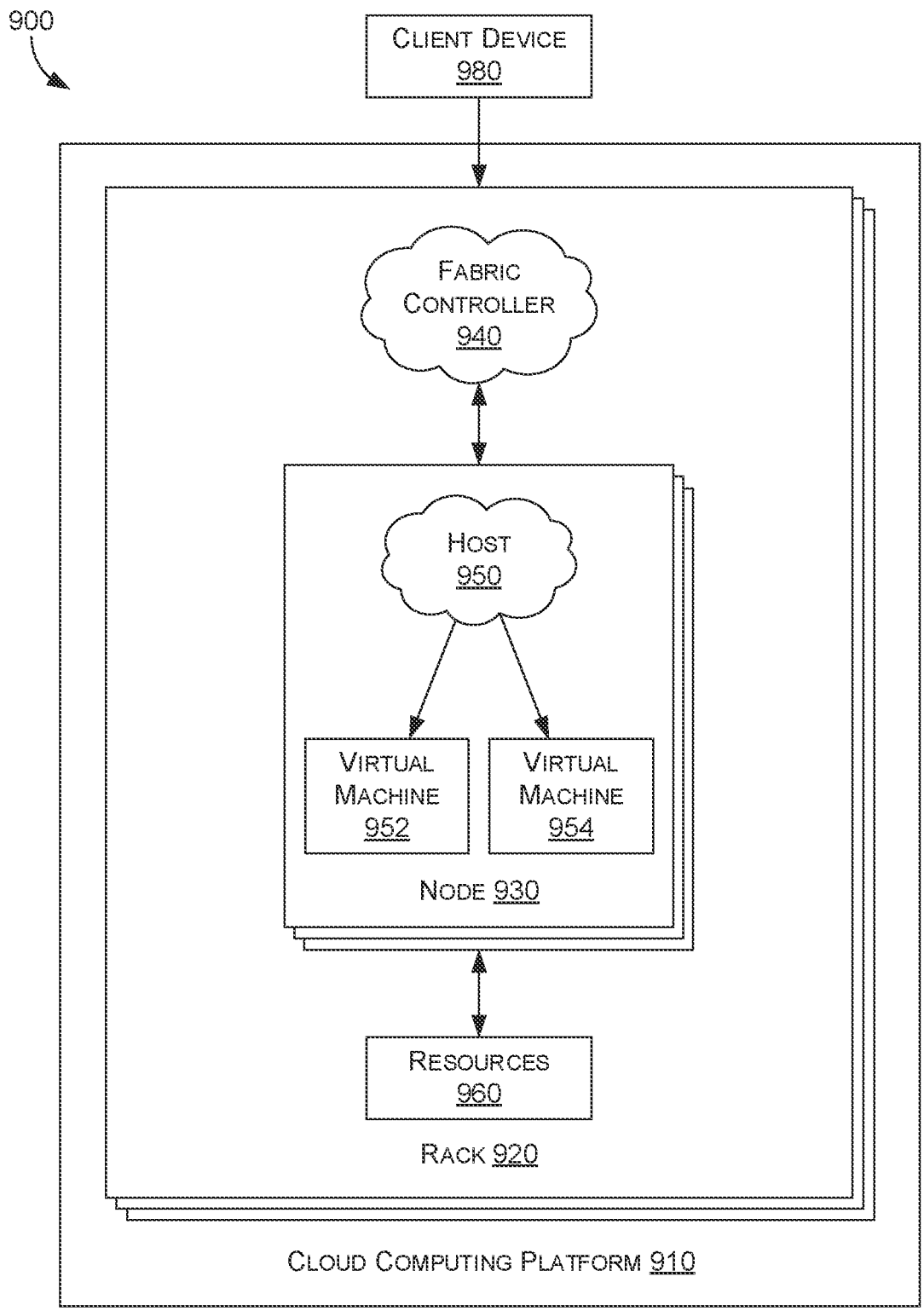
FIG. 9 depicts a block diagram of an example distributed computing environment suitable for use in implementing aspects of the technology described herein.
Figure 10:
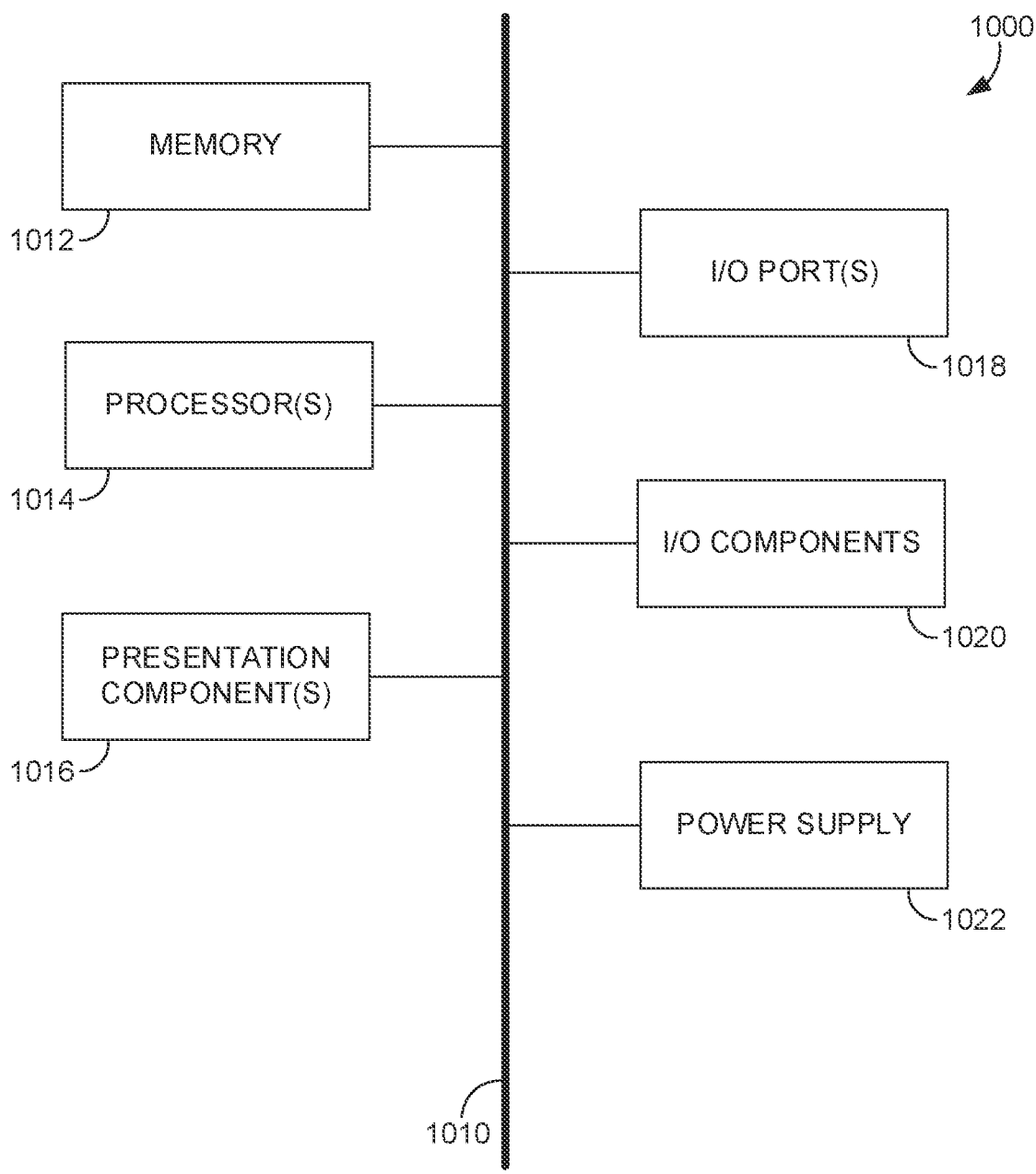
FIG. 10 is a block diagram of an example computing device suitable for use in implementing aspects of the technology described herein.

As illustrated, the host computing device 210 includes a processor 202, memory 204, and/or an interface 208 (for example, presentation component 1016 of FIG. 10). Processor 202, memory 204, and/or an interface 208 are further described with reference to FIGS. 9 and 10, for example, for use in implementing embodiments of the technical solution are shown. In embodiments, memory 204 (for example, memory as shown in the example of FIGS. 1A-D or any type of memory) can be optimized in order to store the data of a cache line and/or metadata of the cache line necessary to execute instructions by the processor 202. Memory 204 stores data corresponding to each cache line and data corresponding to each cache line is stored as a number of codewords. Each of the codewords of each cache line include a number of message symbols and parity symbols. The message symbols are made up of a number of message bits of the data of the cache line and the parity symbols are determined based on the message symbols of the codeword and metadata symbol(s) to be encoded into the codeword. As an example, and with reference to FIG. 1C, the cache line is made up of four (4) codewords (for example, codewords 160). Four (4) codewords are shown as an example and any number of codewords of a cache line are contemplated). Each of the codewords include symbols stored on a number of DQs on a number of memory devices and each DQ corresponds to a bit of data stored on the memory device. In the example shown in FIG. 1C, each symbol of each codeword 160 includes 4 DQs on each device and there are N number of memory devices 120 (for example, memory device 0, memory device 1, memory device 2 and memory device N).

In conventional implementations, symbols of each device correspond to specific type of symbol. For example, referring to FIG. 1C, each symbol of memory device 1 would correspond to message symbols made up of message bits, and each symbol of memory device 2 would correspond to parity symbols made up of parity bits. However, when bits in parity symbols are replaced with metadata bits, error correction capabilities are diminished, which can lead to uncorrectable or miscorrection of errors (for example, miscorrection 180 of FIG. 1D).

Instead, embodiments of the present disclosure improve capacity and reliability of processing cache lines with metadata symbols encoded into parity symbols of codewords of the cache lines by rotating symbols of the codewords of the cache line before storage in memory 204 example through cache line codeword rotation system 200. Data for a cache line and metadata for the cache line are accessed by a memory controller 212. Memory controller 212, through cache line encoder 214, determines the message symbols for the cache line from the data through message data encoder engine 216.

Memory controller 212, through cache line encoder 214, determines the metadata symbols for the cache line from the metadata for the cache line through metadata encoder engine 218. In some embodiments, the metadata symbol is shared by some or all codewords of the cache line bits to create dependency between the metadata symbols of each codeword. In some embodiments, the metadata symbol is different for each codeword of the cache line. In embodiments where the metadata symbol is different for each codeword of the cache line, the metadata symbols for some or all of the codewords of the cache line may share one or more metadata bits to create dependency between the metadata symbols of each codeword.

Memory controller 212, through cache line encoder 214, then determines the parity symbols for each codeword based on the metadata symbols and message symbols of each codeword through error correction code encoder engine 220. An ECC algorithm can be used to generate the parity symbols by error correction code encoder engine 220. For example, RS codes can be used by error correction code encoder engine 220. Any type of ECC algorithm is within the scope of embodiments of the present disclosure.

Memory controller 212, through cache line encoder 214, then omits the metadata symbols of each codeword and rotates the message and parity symbols of each codeword through rotation encoder engine 222. Memory controller 212 the stores the rotated message and parity symbols of each codeword in memory 204. In this regard, in some embodiments, as can be understood with reference to the memory locations discussed with reference to FIG. 1C, the message symbols and parity symbols of each codeword for the cache line are not stored on the same device in memory.

For example, with reference to FIG. 3, symbol location S0, which stores parity symbol p2 will store parity symbol p2 for codeword 1, message symbol m8 for codeword 2, message symbol m7 for codeword 3, and message symbol m6 for codeword 4. Although a rotation of each codeword by an increasing number of symbols (for example, the first/top codeword of rotation encoder engine 322 is rotated by 0 symbols, the second codeword is rotated of rotation encoder engine 322 is rotated by 1 symbol, the third codeword is rotated of rotation encoder engine 322 is rotated by 3 symbols, and the fourth/bottom codeword is rotated of rotation encoder engine 322 is rotated by 4 symbols), a rotation by any number of symbols for any number of codewords are within the scope of embodiments of the present disclosure.

Turning back to FIG. 2, when the data of the cache line and/or metadata for the cache line is accessed through memory 204, the memory controller 212 accesses the rotated message and parity symbols from memory 204. For example, the memory controller 212 accesses the data of the cache line as stored in memory 204. The data of the cache line is stored as a number of codewords with rotated symbols as discussed with reference rotation encoder engine 222. The memory controller then determines, through cache line decoder 224, the corresponding unrotated codewords through rotation decoder engine 232. The determination of the corresponding unrotated codewords can be based on stored relationships accessible by the memory controller 212. For example, the memory controller 212 can store the number of symbols that each codeword is rotated by with respect to rotation decoder engine 232.

The memory controller 212, through cache line decoder 224, uses a corresponding ECC algorithm to obtain the metadata symbols and/or correct errors in the message symbols based on parity symbols in the rotation of the message and parity symbols of the codewords through error correction code decoder engine 230. In this regard, each metadata bit of each metadata symbols is either a 1 or 0, the memory controller 212 can use the ECC algorithm and parity symbols to determine each metadata bit of each metadata symbol through error correction code decoder engine 230. Further, the memory controller 212, through cache line decoder 224, can use the ECC algorithm to correct errors detected in message bits of a codeword based on the parity symbols through error correction code decoder engine 230. Even further, when there are dependencies between metadata symbols in each of the codewords (for example, shared metadata bits and/or symbols between metadata symbols of some or all of the codewords), the memory controller 212, through cache line decoder 224, can determine the metadata symbols and/or correct any errors based on a maximum likelihood of the metadata symbol being correct or the maximum likelihood of error correction as determined from any errors (or lack of errors) detected in each codewords of the cache line through error correction code decoder engine 230.

The memory controller 212, through cache line decoder 224, can then access the metadata based on the decoded metadata symbols (for example, metadata decoder engine 228). The memory controller, through cache line decoder 224, can also access the data of the cache line based on the decoded (and possible error-corrected) message symbols (for example, message data decoder engine 226). In this regard, the capacity of data stored memory for the cache line is increased by encoding metadata into parity symbols of codewords while increasing the reliability of error detection and correction capability.

FIG. 3 depicts a block diagram of an example cache line codeword rotation encoding system to programmatically rotate symbols of codewords of cache lines, in accordance with aspects of the technology described herein. As illustrated in the example, data 302 for a cache line and metadata 304 for the cache line are accessed by a memory controller 312. The memory controller 312 determines the message symbols for the cache line from the data of the cache line through message data encoder engine 316. As can be understood, in the example discussed with respect to FIG. 1C, each message symbol corresponds to the number of message bits stored on each device for each codeword.

The memory controller 312 determines the metadata symbols for the cache line from the metadata for the cache line through metadata encoder engine 318. In some embodiments, metadata encoder engine 318 encodes the metadata symbol so that the metadata symbol is shared by some or all codewords of the cache line to create dependency between the metadata symbols of each codeword. In some embodiments, metadata encoder engine 318 encodes the metadata symbol so that the metadata symbol is different for each codeword of the cache line. In embodiments when metadata encoder engine 318 encodes the metadata symbol so that the metadata symbol is different for each codeword of the cache line, the metadata symbols for some or all of the codewords of the cache line may share one or more metadata bits to create dependency between the metadata symbols of some or all of the codewords.

The memory controller 312 then determines the parity symbols for each codeword based on the metadata symbols and message symbols of each codeword through error correction code encoder engine 320. Error correction code encoder engine 320 can use an ECC algorithm generate the parity symbols. For example, error correction code encoder engine 320 can use RS codes. In the example shown in FIG. 3, the parity symbols can be generated by an RS (11,9) code through error correction code encoder engine 320. However, any type of ECC algorithm is within the scope of embodiments of the present disclosure.

The memory controller 312 then omits the metadata symbols of each codeword and rotates the message and parity symbols of each codeword through rotation encoder engine 322. The memory controller 312 then stores the rotated message and parity symbols of each codeword in memory 306. In this regard, in some embodiments, as can be understood with reference to the memory locations discussed with reference to FIG. 1C, the message symbols and parity symbols of each codeword for the cache line are not stored on the same device in memory. For example, with reference to FIG. 3, symbol location S0, which stores parity symbol p2 will store parity symbol p2 for codeword 1, message symbol m8 for codeword 2, message symbol m7 for codeword 3, and message symbol m6 for codeword 4. Although a rotation of each codeword by an increasing number of symbols (for example, the first/top codeword of rotation encoder engine 322 is rotated by 0 symbols, the second codeword is rotated of rotation encoder engine 322 is rotated by 1 symbol, the third codeword is rotated of rotation encoder engine 322 is rotated by 3 symbols, and the fourth/bottom codeword is rotated of rotation encoder engine 322 is rotated by 4 symbols), a rotation by any number of symbols for any number of codewords are within the scope of embodiments of the present disclosure.

Normally, codewords generated by RS codes are cyclic at the symbol level in that if symbols of a codeword are cyclically shifted, the resulting codeword is also a valid codeword of the same RS code. As such, the rotation of any fault pattern, will be another fault pattern with the same property, which may result in a miscorrection of an error or an uncorrectable error. However, as the metadata symbol used to generate the codeword is omitted from the codeword before cyclically shifting code word through rotation encoder engine 322, the codeword is noncyclic and less likely to be a valid codeword as rotated. In this regard, the fault patterns causing decoding failure will have different properties with different rotations because metadata symbol is not written in the memory, but used to generate the ECC codeword from the same location. Therefore, the rotation of any fault pattern on any symbol will have a different effect compared to unrotated pattern.

FIG. 4 depicts a block diagram of an example cache line codeword rotation decoding system to programmatically decode codewords of cache lines with rotated symbols, in accordance with aspects of the technology described herein. As illustrated in the example, when the data of the cache line (for example, data 402) and/or metadata 404 for the cache line is accessed, the memory controller 412 accesses the rotated message and parity symbols from memory 406. The memory controller 412 uses the ECC algorithm of error correction code decoder engine 430 to obtain the metadata symbols and/or correct errors in the message symbols based on parity symbols in the rotation of the message and parity symbols of the codewords.

For example, with reference to FIG. 4, the memory controller 412 accesses the data of the cache line as stored in memory 406. The data of the cache line is stored as a number of codewords with rotated symbols as discussed with reference to FIG. 3. In the example shown in FIG. 4, there are four (4) codewords, however, any number of codewords for any number of cache lines are with the scope of embodiments of the present disclosure. The memory controller 412 then determines the corresponding unrotated codewords through rotation decoder engine 432. The determination of the corresponding unrotated codewords through rotation decoder engine 432 can be based on stored relationships accessible by the memory controller 412. For example, the memory controller 412 can store the number of symbols that each codeword is rotated by with respect to rotation decoder engine 432.

The memory controller 412 uses a corresponding ECC algorithm to obtain the metadata symbols and/or correct errors in the message symbols based on parity symbols in the rotation of the message and parity symbols of the codewords through error correction code decoder engine 430. In this regard, each metadata bit of each metadata symbols is either a 1 or 0, the memory controller 412 can use the ECC algorithm and parity symbols to determine each metadata bit of each metadata symbol. Further, the memory controller can use the ECC algorithm of error correction code decoder engine 420 to correct errors detected in message bits of a codeword based on the parity symbols. Even further, when there are dependencies between metadata symbols in each of the codewords (for example, shared metadata bits and/or symbols between metadata symbols of some or all of the codewords), the memory controller 412 can determine the metadata symbols and/or correct any errors through error correction code decoder engine 430 based on a maximum likelihood of the metadata symbol being correct or the maximum likelihood of error correction as determined from any errors (or lack of errors) detected in each codewords of the cache line.

The memory controller 412 can then access the metadata 404 based on the decoded metadata symbols through metadata decoder engine 428. The memory controller 412 can also access the data of the cache line (for example, data 402) based on the decoded (and possible error-corrected) message symbols through message data decoder engine 426). In this regard, the capacity of data stored in memory for the cache line is increased by encoding metadata into parity symbols of codewords while increasing the reliability of error detection and correction capability.

Figure 5A:
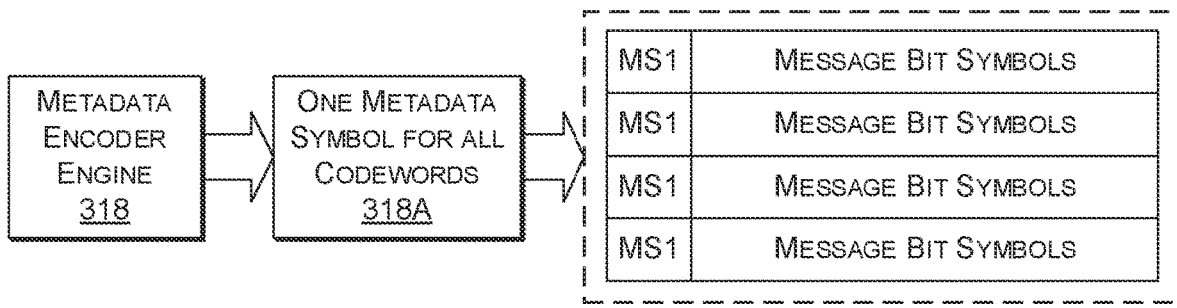
FIGS. 5A-C depict block diagrams of examples of encoding metadata symbols into cache line codewords before programmatically generating parity bits and programmatically rotating symbols of codewords of cache lines, in accordance with aspects of the technology described herein.
Figure 5B:
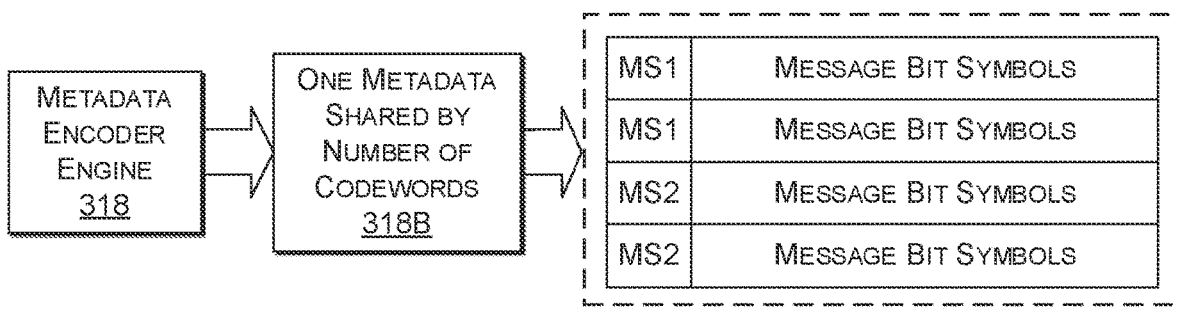
Figure 5C:
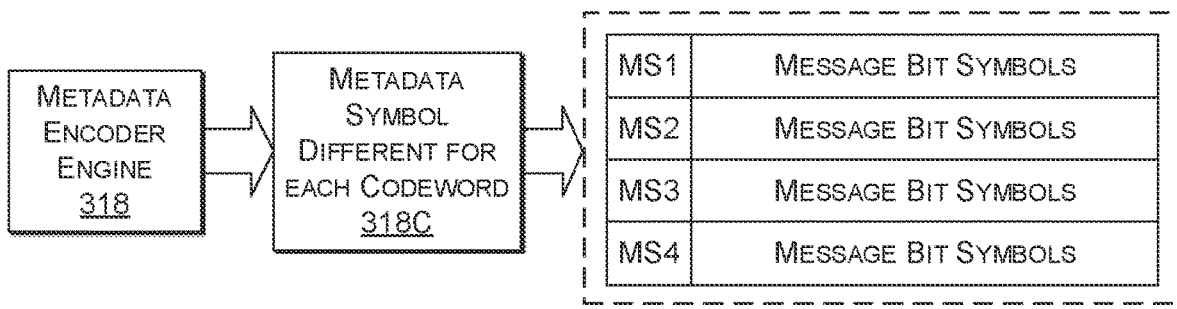

Turning to FIGS. 5A-C, illustrated are block diagrams of examples of encoding metadata symbols into cache line codewords before programmatically generating parity bits and programmatically rotating symbols of codewords of cache lines, in accordance with aspects of the technology described herein. As illustrated in the examples of FIGS. 5A-C, the memory controller (for example, memory controller 110 of FIG. 1A, memory controller 212 of FIG. 2, memory controller 312 of FIG. 3, memory controller 412 of FIG. 4, and the like) determines the metadata symbols for the cache line from the metadata for the cache line through metadata encoder engine 318. In some embodiments, as shown in the examples of FIGS. 5A and 5B, the metadata symbol is shared by some (for example, one metadata shared by each set of two codewords in 318B of FIG. 5B) or all codewords (for example, one metadata shared by all four codewords in 318A of FIG. 5A) of the cache line to create dependency between the metadata symbols of each codeword. In some embodiments, as shown in the example of 318C of FIG. 5C, the metadata symbol is different for each codeword of the cache line. In embodiments where the metadata symbol is different for each codeword of the cache line, the metadata symbols for some or all of the codewords of the cache line may share one or more metadata bits to create dependency between the metadata symbols of each codeword.

In this regard, when there are dependencies between metadata symbols in each of the codewords (for example, shared metadata bits and/or symbols between metadata symbols of some or all of the codewords), the memory controller 312 can determine the metadata symbols and/or correct any errors based on a maximum likelihood of the metadata symbol being correct or the maximum likelihood of error correction as determined from any errors (or lack of errors) detected in each codewords of the cache line.

Figure 6:
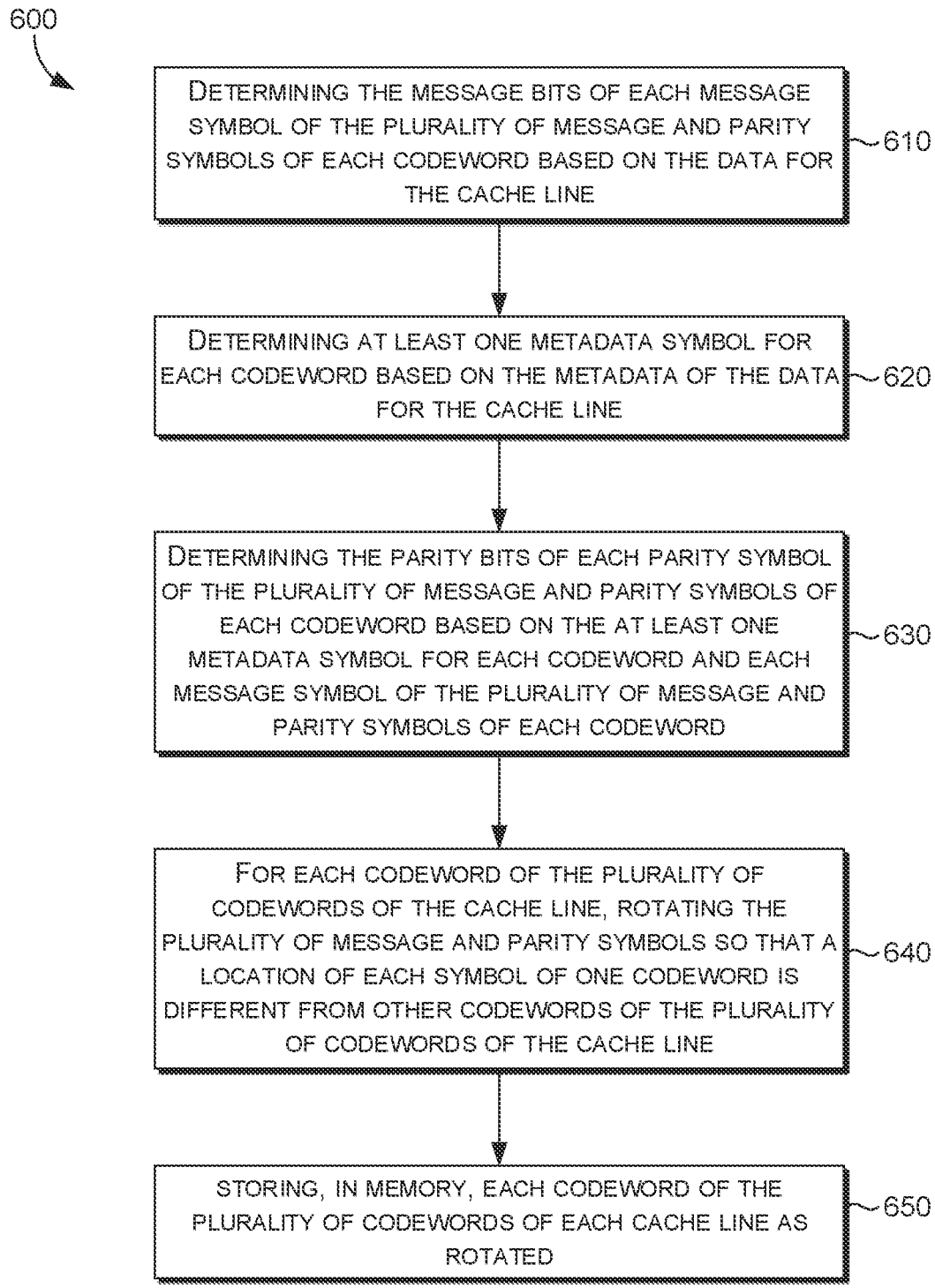
FIG. 6 depicts a first example method to programmatically rotate symbols of codewords of cache lines, in accordance with aspects of the technology described herein.
Figure 7:
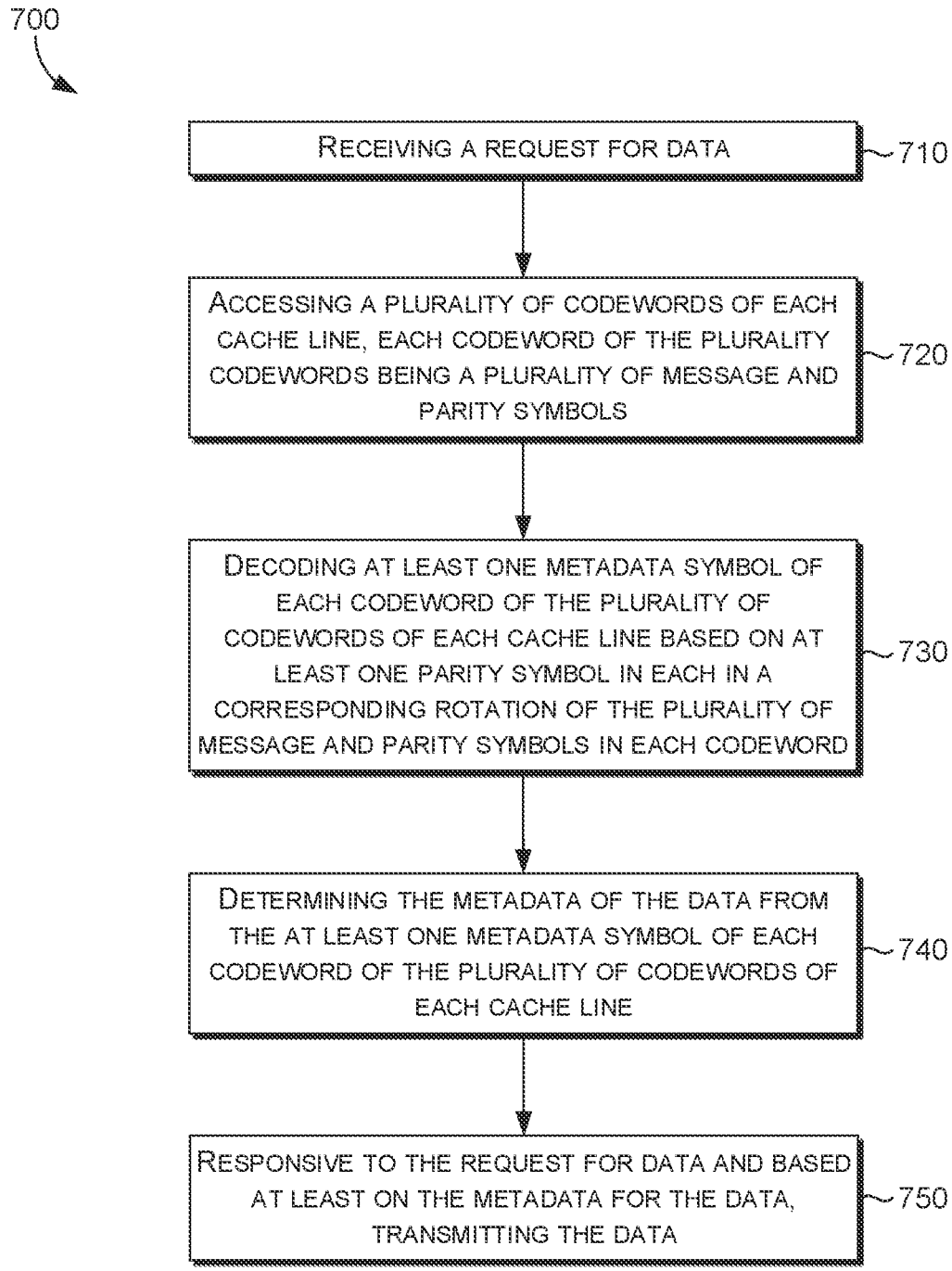
FIG. 7 depicts a second example method to programmatically access metadata of a cache line within rotated symbols of codewords of the cache line, in accordance with aspects of the technology described herein.
Figure 8:
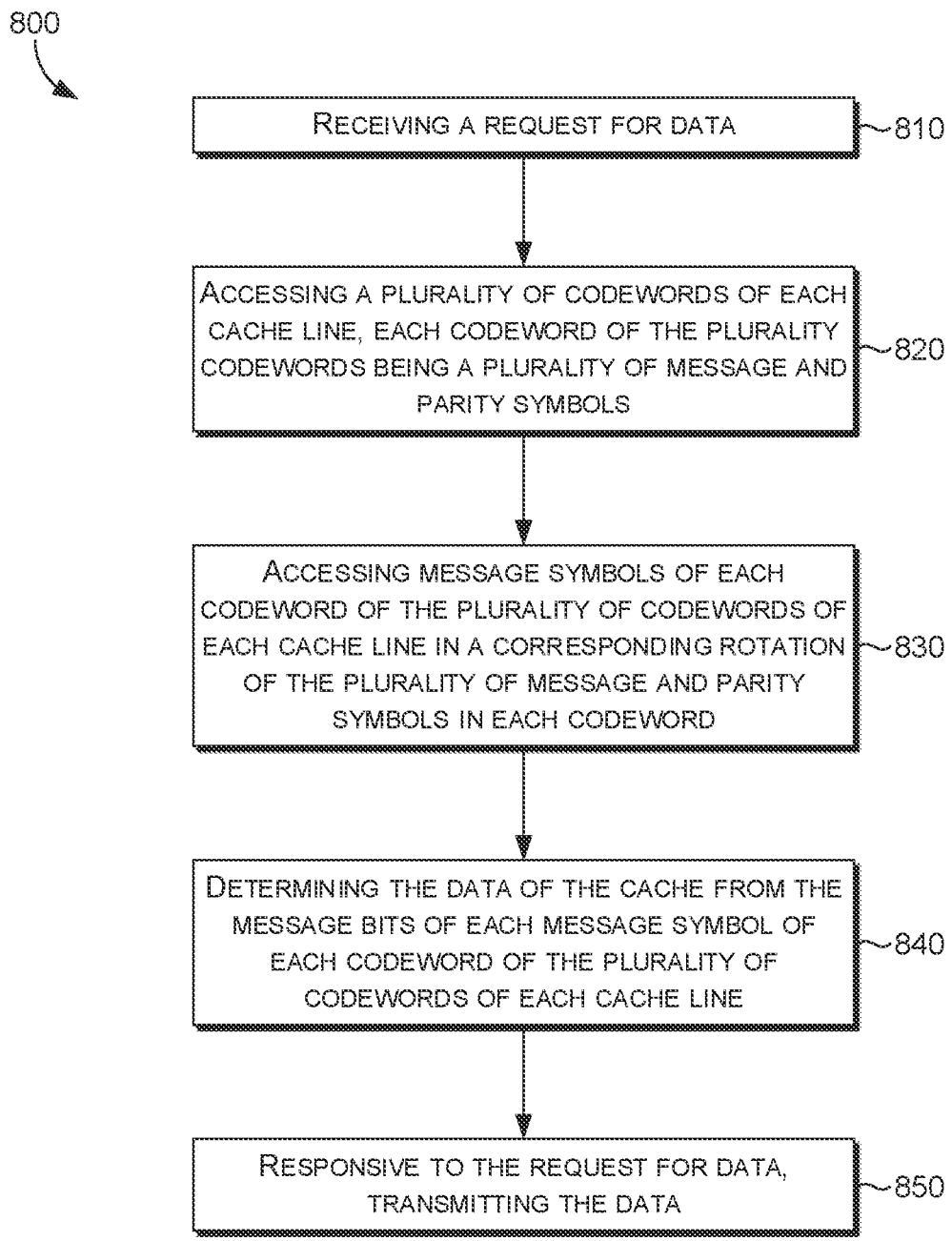
FIG. 8 depicts a third example method to programmatically access data of a cache line within rotated symbols of codewords of the cache line, in accordance with aspects of the technology described herein.

With reference to FIGS. 6, 7, and 8, flow diagrams are provided illustrating methods to programmatically rotate symbols of codewords of cache lines for increased capacity and reliability, such as shown in FIGS. 1B and 2-5C. In some embodiments, one or more components of the host computing device 100 (FIG. 1A), memory controller 110 (FIG. 1A), the cache line codeword rotation system 200 (FIG. 2), memory controller 312 (FIG. 3), memory controller 412 (FIG. 4) and/or the metadata encoder engine 318 (FIGS. 3 and 5A-C) perform the methods illustrated in FIGS. 6, 7, and 8. In some embodiments, one or more computer storage media having computer-executable or computer-useable instructions embodied thereon that, when executed by one or more processors, cause the one or more processors to perform the methods (for example, computer-implemented method) in the cache line codeword rotation system 200 (for example, a computerized system or computing system).

Turning to FIG. 6, at block 610, the process 600 of encoding data of the cache line and metadata of the cache line into a plurality of codewords of each cache line includes, at block 610, the memory controller determines the message bits of each message symbol of the plurality of message and parity symbols of each codeword based on the data for the cache line, for example, through an memory controller 110 (FIG. 1A), memory controller 212 (FIG. 2), memory controller 312 (FIG. 3), memory controller 412 (FIG. 4), and the like.

At block 620, the memory controller determines at least one metadata symbol for each codeword based on the metadata of the cache line. In some embodiments, the metadata symbol is shared by some or all codewords of the cache line bits to create dependency between the metadata symbols of each codeword. In some embodiments, the metadata symbol is different for each codeword of the cache line. In embodiments where the metadata symbol is different for each codeword of the cache line, the metadata symbols for some or all of the codewords of the cache line may share one or more metadata bits to create dependency between the metadata symbols of each codeword.

At block 630, the memory controller determines the parity bits of each parity symbol of the plurality of message and parity symbols of each codeword based on the at least one metadata symbol for each codeword and each message symbol of the plurality of message and parity symbols of each codeword. For example, RS codes can be used by the memory controller. Any type of ECC algorithm is within the scope of embodiments of the present disclosure.

At block 640, for each codeword of the plurality of codewords of the cache line, the memory controller rotates the plurality of message and parity symbols so that a location of each symbol of one codeword is different from other codewords of the plurality of codewords of the cache line. In embodiments, the memory controller omits each metadata symbol from each codeword each codeword before the memory controller rotates the plurality of message and parity symbols.

At block 650, the memory controller stores, in memory, each codeword of the plurality of codewords of each cache line as rotated. In this regard, data and metadata of the cache line are encoded into a plurality of codewords of each cache line by the memory controller, thereby increasing the capacity of the memory while also increasing reliability of the cache line.

Turning to FIG. 7, the process 700 includes, at block 710, receiving, by a memory controller, a request for data of a cache line, for example, through an memory controller 110 (FIG. 1A), memory controller 212 (FIG. 2), memory controller 312 (FIG. 3), memory controller 412 (FIG. 4), or the like.

At block 720, responsive to the request for data of the cache line, the memory controller accesses metadata of the cache line by accessing a plurality of codewords of the cache line, each codeword of the plurality codewords being a plurality of message and parity symbols. At block 730, the memory controller decodes at least one metadata symbol of each codeword of the plurality of codewords of the cache line based on at least one parity symbol in each in a corresponding rotation of the plurality of message and parity symbols in each codeword. In some embodiments, the metadata symbol is shared by some or all codewords of the cache line to create dependency between the metadata symbols of each codeword. In some embodiments, the metadata symbol is different for each codeword of the cache line. In embodiments where the metadata symbol is different for each codeword of the cache line, the metadata symbols for some or all of the codewords of the cache line may share one or more metadata bits to create dependency between the metadata symbols of each codeword.

At block 740, the memory controller determines the metadata of the cache line from the at least one metadata symbol of each codeword of the plurality of codewords of the cache line. In some embodiments, the memory controller detects and/or corrects errors in the message symbols and/or metadata symbols of the data and/or metadata of the cache line based on the parity symbols of the codewords. At block 750, responsive to the request for data of the cache line and based at least on the metadata for the cache line, transmitting the data of the cache line.

Turning to FIG. 8, the process 800 includes, at block 810, receiving, by a memory controller, a request for data of a cache line, for example, through an memory controller 110 (FIG. 1A), memory controller 212 (FIG. 2), memory controller 312 (FIG. 3), memory controller 412 (FIG. 4), or and the like.

At block 820, the memory controller accesses a plurality of codewords of the cache line, each codeword of the plurality codewords being a plurality of message and parity symbols. At block 830, the memory controller accesses message symbols of each codeword of the plurality of codewords of each cache line in a corresponding rotation of the plurality of message and parity symbols in each codeword.

At block 840, the memory controller determines the data of the cache line from the message bits of each message symbol of each codeword of the plurality of codewords of the cache line. In some embodiments, the memory controller detects and/or corrects errors in the message symbols and/or metadata symbols of the cache line based on the parity symbols of the cache line. At block 850, the data of the cache line is transmitted in response to the request.

OTHER EMBODIMENTS

In some embodiments, a computerized system is provided, employing any components of the computerized (or computer, computing, or cloud) system described in any of the embodiments above. The computerized system comprises at least one computer processor, and computer memory having computer-readable instructions embodied thereon, that, when executed by the at least one computer processor, perform operations. The operations comprise encoding data and metadata of a cache line into a plurality of codewords, each codeword of the plurality codewords comprising a plurality of symbols, the plurality of symbols comprising (1) at least one message symbol comprising message bits and (2) at least one parity symbol comprising parity bits, encoding the data and the metadata of the cache line into the plurality of codewords comprising: determining the message bits of the at least one message symbol of each codeword based on the data of the cache line; determining at least one metadata symbol for each codeword based on the metadata of the cache line; determining the parity bits of the at least one parity symbol of each codeword based on (1) the at least one metadata symbol for each codeword and (2) the at least one message symbol of each codeword; for each codeword of the plurality of codewords, omitting the at least one metadata symbol and rotating the plurality of symbols so that a location of each symbol of one codeword is different from other codewords of the plurality of codewords; and storing, in memory, each codeword of the plurality of codewords with the corresponding rotation of the plurality of symbols of each codeword.

Advantageously, the reliability of memory is improved by rotating symbols of the codewords of the cache line, with metadata symbols encoded into parity of codewords, before storage in memory. In this manner, there is a higher probability of detecting and/or correcting errors caused by a memory device due to the rotating of symbols of the codewords of the cache line. Accordingly, embodiments of the present disclosure improve reliability of data storage and data retrieval to avoid impacts to other systems and services in a distributed or local environment, thereby improving a user experience and reducing computational resource consumption associated with further remedying error correction shortcoming in the current technology landscape. Further, as the capacity of memory is increased by encoding metadata symbols into codewords without having to store the metadata symbols in memory, computing resources, such as storage space in memory, are reduced and networking resources, such as bandwidth for transmission if the data is transmitted over a network, is reduced.

In any combination of the above embodiments of the computerized system, the at least one metadata symbol determined for each codeword is shared by all codewords of the plurality of codewords of the cache line.

In any combination of the above embodiments of the computerized system, the at least one metadata symbol determined for each codeword is shared by a number of codewords of the plurality of codewords of the cache line.

In any combination of the above embodiments of the computerized system, a number of metadata bits of the at least one metadata symbol determined for each codeword is shared by a number of codewords of the plurality of codewords of the cache line.

In any combination of the above embodiments of the computerized system, the operations further comprise detecting an error in one codeword of the plurality of codewords based on an expected location of the at least one parity symbol in the one codeword's corresponding rotation of the plurality of symbols; and correcting the error in the one codeword based on the at least one parity symbol.

In any combination of the above embodiments of the computerized system, the correction of the error of the one codeword is based on a maximum likelihood of error correction as determined from errors detected in each corresponding rotation of the plurality of symbols in each codeword of the plurality of codewords.

In any combination of the above embodiments of the computerized system, the operations further comprise accessing metadata of the cache line by: accessing the plurality of codewords; decoding the at least one metadata symbol of each codeword of the plurality of codewords based on the at least one parity symbol in each corresponding rotation of the plurality of symbols; and determining the metadata of the cache line from the at least one metadata symbol of each codeword of the plurality of codewords.

In any combination of the above embodiments of the computerized system, the operations further comprise accessing the data of each cache line by: accessing the plurality of codewords; accessing the message symbols of each codeword of the plurality of codewords in each corresponding rotation of the plurality of symbols in each codeword; and determining the data of the cache line from the message bits of each message symbol of each codeword of the plurality of codewords.

In any combination of the above embodiments of the computerized system, the at least one parity symbol of each codeword of the plurality of codewords is determined through Reed-Solomon (RS) codes.

In some embodiments, a computer-implemented method is provided and is implemented using any of the embodiments described herein. The computer-implemented method includes receiving a request for data of a cache line; responsive to the request for data, accessing metadata of the cache line by: accessing a plurality of codewords, each codeword of the plurality codewords comprising a plurality of symbols, the plurality of symbols comprising (1) at least one message symbol comprising message bits and (2) at least one parity symbol comprising parity bits; decoding at least one metadata symbol from the plurality of codewords based on a location of the at least one parity symbol in a corresponding rotation of the plurality of symbols of each codeword of the plurality of codewords; and determining the metadata of the cache line from the at least one metadata symbol of each codeword of the plurality of codewords; and based at least on the metadata of the cache line, transmitting the data of the cache line.

Advantageously, the reliability of memory is improved by rotating symbols of the codewords of the cache line, with metadata symbols encoded into parity of codewords, before storage in memory. In this manner, there is a higher probability of detecting and/or correcting errors caused by a memory device due to the rotating of symbols of the codewords of the cache line. Accordingly, embodiments of the present disclosure improve reliability of data storage and data retrieval to avoid impacts to other systems and services in a distributed or local environment, thereby improving a user experience and reducing computational resource consumption associated with further remedying error correction shortcoming in the current technology landscape. Further, as the capacity of memory is increased by encoding metadata symbols into codewords without having to store the metadata symbols in memory, computing resources, such as storage space in memory, are reduced and networking resources, such as bandwidth for transmission if the data is transmitted over a network, is reduced.

In any combination of the above embodiments of the computer-implemented method, the at least one metadata symbol determined for each codeword is shared by all codewords of the plurality of codewords of the cache line.

In any combination of the above embodiments of the computer-implemented method, the at least one metadata symbol determined for each codeword is shared by a number of codewords of the plurality of codewords of the cache line.

In any combination of the above embodiments of the computer-implemented method, a number of metadata bits of the at least one metadata symbol determined for each codeword is shared by a number of codewords of the plurality of codewords of the cache line.

In any combination of the above embodiments of the computer-implemented method, further comprising detecting an error of a metadata symbol in one codeword of the plurality of codewords based on an expected location of the at least one parity symbol in the one codeword's corresponding rotation of the plurality of symbols; and correcting the error of the metadata symbol in the one codeword based on the at least one parity symbol.

In any combination of the above embodiments of the computer-implemented method, the correction of the error of the metadata symbol is based on a maximum likelihood of error correction as determined from errors detected in the corresponding rotation of symbols in each codeword of the plurality of codewords.

In any combination of the above embodiments of the computer-implemented method, further comprising: accessing the data of the cache line by: accessing message symbols of each codeword of the plurality of codewords in each corresponding rotation of the plurality of symbols in each codeword; and determining the data of the cache line from the message bits of each message symbol of each codeword of the plurality of codewords.

In some embodiments, at least one computer-storage media is provided. The computer-storage media has computer-executable instructions embodied thereon that, when executed by a computing system having at least one processor and at least one memory, cause the computing system or the at least one processor to perform operations comprising: receiving a request for data of a cache line; responsive to the request for the data of the cache line, accessing the data of the cache line by: accessing a plurality of codewords, each codeword of the plurality codewords comprising a plurality of symbols, the plurality of symbols comprising (1) at least one message symbol comprising message bits and (2) at least one parity symbol comprising parity bits; accessing message symbols of each codeword of the plurality of codewords in a corresponding rotation of the plurality of symbols of each codeword; and determining the data of the cache line from each message symbol and each parity symbol of each codeword of the plurality of codewords of each cache line; and transmitting the data of the cache line.

Advantageously, the reliability of memory is improved by rotating symbols of the codewords of the cache line, with metadata symbols encoded into parity of codewords, before storage in memory. In this manner, there is a higher probability of detecting and/or correcting errors caused by a memory device due to the rotating of symbols of the codewords of the cache line. Accordingly, embodiments of the present disclosure improve reliability of data storage and data retrieval to avoid impacts to other systems and services in a distributed or local environment, thereby improving a user experience and reducing computational resource consumption associated with further remedying error correction shortcoming in the current technology landscape. Further, as the capacity of memory is increased by encoding metadata symbols into codewords without having to store the metadata symbols in memory, computing resources, such as storage space in memory, are reduced and networking resources, such as bandwidth for transmission if the data is transmitted over a network, is reduced.

In any combination of the above embodiments of the at least one computer-storage media, the operations further comprise detecting an error of a message symbol in one codeword of the plurality of codewords of the cache line based on an expected location of at least one parity symbol in the one codeword's corresponding rotation of the plurality of symbols; and correcting the error of the message symbol in the one codeword based on the at least one parity symbol.

In any combination of the above embodiments of the at least one computer-storage media, the correction of the error of the message symbol is based on a maximum likelihood of error correction as determined from errors detected in the corresponding rotation of the plurality of message and parity symbols in each codeword of the plurality of codewords of the cache line.

In any combination of the above embodiments of the at least one computer-storage media, the operations further comprise accessing metadata of the cache line by: decoding at least one metadata symbol of each codeword of the plurality of codewords based on at least one parity symbol in each corresponding rotation of the plurality of symbols in each codeword; and determining the metadata of the cache line from the at least one metadata symbol of each codeword of the plurality of codewords.

Example Computing Environment

Having described various implementations, example computing environments suitable for implementing embodiments of the disclosure are now described, including an example distributed computing environment and an example computing device in FIGS. 9 and 10, respectively. Embodiments of the disclosure are described in the general context of computer code or machine-useable instructions, including computer-useable or computer-executable instructions, such as program modules, being executed by a computer or other machine such as a smartphone, a tablet, personal computer (PC), or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media including memory storage devices.

Some embodiments comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low-level functions relating to, for example, logic, control, and memory operations. Low-level software written in machine code can provide more complex functionality to higher levels of software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated with the embodiments of the present disclosure.

Referring now to FIG. 9, FIG. 9 illustrates an example distributed computing environment 900 in which implementations of the present disclosure can be employed. In particular, FIG. 9 shows a high-level architecture of an example cloud computing platform 910 that can host a technical solution environment, or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 900, which includes cloud computing platform 910, rack 920, and node 930 (for example, computing devices, processing units, or blades) in rack 920. The technical solution environment can be implemented with cloud computing platform 910 that runs cloud services across different data centers and geographic regions. Cloud computing platform 910 can implement fabric controller 940 component for provisioning and managing resource allocation, deployment, upgrade, and management of cloud services. Typically, cloud computing platform 910 acts to store data or run service applications in a distributed manner. Cloud computing platform 910 in a data center can be configured to host and support operation of endpoints of a particular service application. Cloud computing platform 910 may be a public cloud, a private cloud, or a dedicated cloud.

Node 930 can be provisioned with host 950 (for example, operating system or runtime environment) running a defined software stack on node 930. Node 930 can also be configured to perform specialized functionality (for example, compute nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a multi-tenant infrastructure or tenancy. The terms service application, application, or service are used interchangeably herein and broadly refer to any software, or portions of software, that run on top of storage, access storage, and compute device locations within a datacenter.

When more than one separate service application is being supported by nodes 930, nodes 930 may be partitioned into virtual machines (for example, virtual machine 952 and virtual machine 954). Physical machines can also concurrently run separate service applications. The virtual machines or physical machines can be configured as individualized computing environments that are supported by resources 960 (for example, hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In particular, the servers may perform data operations independently but exposed as a single device referred to as a cluster. Each server in the cluster can be implemented as a node.

Client device 980 may be linked to a service application in cloud computing platform 910. Client device 980 may be any type of computing device, which may correspond to computing device 1000 described with reference to FIG. 10. For example, client device 980 is configured to issue commands to cloud computing platform 910. In embodiments, client device 980 communicates with service applications through a virtual Internet Protocol (IP) and load balancer or other means that direct communication requests to designated endpoints in cloud computing platform 910. The components of cloud computing platform 910 may communicate with each other over a network (not shown), which may include, without limitation, one or more local area networks (LANs) and/or wide area networks (WANs).

With reference to FIG. 10, an example computing device is provided and referred to generally as computing device 1000. The computing device 1000 is but one example of a suitable computing environment and is not intended to suggest any limitation as to the scope of use or functionality of embodiments of the disclosure, and nor should the computing device 1000 be interpreted as having any dependency or requirement relating to any one or combination of components illustrated. Computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are also contemplated. A presentation component, such as a display device, is an example of an I/O component. Also, processors have memory. It is recognized that such is the nature of the art, and reiterated that the diagram of FIG. 10 is merely illustrative of an example computing device that can be used in connection with one or more embodiments of the present invention. Distinction is not made between such categories as "workstation," "server," "laptop," "hand-held device," and the like, as all are contemplated within the scope of FIG. 10 and with reference to "computing device."

Computing device 1000 typically includes a variety of computer-readable media. Computer-readable media can be any available media that can be accessed by computing device 1000 and includes both volatile and non-volatile media, removable and non-removable media. By way of example, and not limitation, computer-readable media include computer storage media and communication media. Computer storage media includes volatile and non-volatile, removable and non-removable media implemented in any method or technology for the storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 1000. Computer storage media excludes signals per se. Communication media typically embodies computer-readable instructions, data structures, program modules, or other data in a modulated data signal such as a carrier wave or other transport mechanism and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or non-volatile memory. The memory may be removable, non-removable, or a combination thereof. Example hardware devices include solid-state memory, hard drives, optical-disc drives, and the like. Computing device 1000 includes one or more processors that read data from various entities such as memory 1012 or I/O components 1020. As used herein, the term processor or "a processor" may refer to more than one computer processor. In one example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor may be performed by more than one processor.

Presentation component(s) 1016 present data indications to a user or other device. Example presentation components include a display device, speaker, printing component, vibrating component, and the like.

I/O ports 1018 allow computing device 1000 to be logically coupled to other devices including I/O components 1020, some of which may be built in. Illustrative components include a microphone, joystick, game pad, satellite dish, scanner, printer, wireless device, and the like.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where N is any positive integer. That is, a set may include 1, 2, 3, . . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases "one or more objects" and "at least one object" may be employed interchangeably to refer to a set of objects that is not the null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment; however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized system, comprising:
    at least one processor; and
    computer memory storing computer-useable instructions that, when executed by the at least one processor, cause the at least one processor to perform operations comprising:
        encoding data and metadata of a cache line into a plurality of codewords, each codeword of the plurality codewords comprising a plurality of symbols, the plurality of symbols comprising (1) at least one message symbol comprising message bits and (2) at least one parity symbol comprising parity bits, encoding the data and the metadata of the cache line into the plurality of codewords comprising:
            determining the message bits of the at least one message symbol of each codeword based on the data of the cache line;
            determining at least one metadata symbol for each codeword based on the metadata of the cache line;
            determining the parity bits of the at least one parity symbol of each codeword based on (1) the at least one metadata symbol for each codeword and (2) the at least one message symbol of each codeword; and
            for each codeword of the plurality of codewords, omitting the at least one metadata symbol and rotating the plurality of symbols so that a location of each symbol of one codeword is different from other codewords of the plurality of codewords; and
        storing each codeword of the plurality of codewords with the corresponding rotation of the plurality of symbols of each codeword.

2. The computerized system of claim 1, wherein the at least one metadata symbol determined for each codeword is shared by all codewords of the plurality of codewords of the cache line.

3. The computerized system of claim 1, wherein the at least one metadata symbol determined for each codeword is shared by a number of codewords of the plurality of codewords of the cache line.

4. The computerized system of claim 1, wherein a number of metadata bits of the at least one metadata symbol determined for each codeword is shared by a number of codewords of the plurality of codewords of the cache line.

5. The computerized system of claim 1, wherein the operations further comprise:
    detecting an error in one codeword of the plurality of codewords based on an expected location of the at least one parity symbol in the one codeword's corresponding rotation of the plurality of symbols; and
    correcting the error in the one codeword based on the at least one parity symbol.

6. The computerized system of claim 5, wherein the correction of the error of the one codeword is based on a maximum likelihood of error correction as determined from errors detected in each corresponding rotation of the plurality of symbols in each codeword of the plurality of codewords.

7. The computerized system of claim 1, wherein the operations further comprise:
  accessing metadata of the cache line by:
    accessing the plurality of codewords;
    decoding the at least one metadata symbol of each codeword of the plurality of codewords based on the at least one parity symbol in each corresponding rotation of the plurality of symbols; and
    determining the metadata of the cache line from the at least one metadata symbol of each codeword of the plurality of codewords.

8. The computerized system of claim 1, wherein the operations further comprise:
  accessing the data of each cache line by:
    accessing the plurality of codewords;
    accessing a message symbol of each codeword of the plurality of codewords in each corresponding rotation of the plurality of symbols in each codeword; and
    determining the data of the cache line from the message bits of each message symbol of each codeword of the plurality of codewords.

9. The computerized system of claim 1, wherein the at least one parity symbol of each codeword of the plurality of codewords is determined through Reed-Solomon (RS) codes.

10. A computer-implemented method, comprising:
  receiving a request for data of a cache line;
  responsive to the request for data, accessing metadata of the cache line by:
    accessing a plurality of codewords, each codeword of the plurality codewords comprising a plurality of symbols, the plurality of symbols comprising (1) at least one message symbol comprising message bits and (2) at least one parity symbol comprising parity bits;
    decoding at least one metadata symbol from the plurality of codewords based on a location of the at least one parity symbol in a corresponding rotation of the plurality of symbols of each codeword of the plurality of codewords; and
    determining the metadata of the cache line from the at least one metadata symbol of each codeword of the plurality of codewords; and
  based at least on the metadata of the cache line, transmitting the data of the cache line.

11. The computer-implemented method of claim 10, wherein the at least one metadata symbol determined for each codeword is shared by all codewords of the plurality of codewords of the cache line.

12. The computer-implemented method of claim 10, wherein the at least one metadata symbol determined for each codeword is shared by a number of codewords of the plurality of codewords of the cache line.

13. The computer-implemented method of claim 10, wherein a number of metadata bits of the at least one metadata symbol determined for each codeword is shared by a number of codewords of the plurality of codewords of the cache line.

14. The computer-implemented method of claim 10, further comprising:

detecting an error of a metadata symbol in one codeword of the plurality of codewords based on an expected location of the at least one parity symbol in the one codeword's corresponding rotation of the plurality of symbols; and
  correcting the error of the metadata symbol in the one codeword based on the at least one parity symbol.

15. The computer-implemented method of claim 14, wherein the correction of the error of the metadata symbol is based on a maximum likelihood of error correction as determined from errors detected in the corresponding rotation of symbols in each codeword of the plurality of codewords.

16. The computer-implemented method of 10, further comprising:
  accessing the data of the cache line by:
    accessing a message symbol of each codeword of the plurality of codewords in each corresponding rotation of the plurality of symbols in each codeword; and
    determining the data of the cache line from the message bits of each message symbol of each codeword of the plurality of codewords.

17. One or more computer storage media having computer-executable instructions embodied thereon that, when executed by a computing system having at least one processor and at least one memory, cause the at least one processor to perform operations comprising:
  receiving a request for data of a cache line;
  responsive to the request for the data of the cache line, accessing the data of the cache line by:
    accessing a plurality of codewords, each codeword of the plurality codewords comprising a plurality of symbols, the plurality of symbols comprising (1) at least one message symbol comprising message bits and (2) at least one parity symbol comprising parity bits;
    accessing a message symbol of each codeword of the plurality of codewords in a corresponding rotation of the plurality of symbols of each codeword; and
    determining the data of the cache line from the at least one message symbol and the at least one parity symbol of each codeword of the plurality of codewords of each cache line; and
  transmitting the data of the cache line.

18. The one or more computer storage media of claim 17, wherein the operations further comprise:
  detecting an error of a message symbol in one codeword of the plurality of codewords of the cache line based on an expected location of at least one parity symbol in the one codeword's corresponding rotation of the plurality of symbols; and
  correcting the error of the message symbol in the one codeword based on the at least one parity symbol.

19. The one or more computer storage media of claim 18, wherein the correction of the error of the message symbol is based on a maximum likelihood of error correction as determined from errors detected in the corresponding rotation of the plurality of message and parity symbols in each codeword of the plurality of codewords of the cache line.

20. The one or more computer storage media of claim 17, wherein the operations further comprise:
  accessing metadata of the cache line by:
    decoding at least one metadata symbol of each codeword of the plurality of codewords based on at least one parity symbol in each corresponding rotation of the plurality of symbols in each codeword; and determining the metadata of the cache line from the at least one metadata symbol of each codeword of the plurality of codewords.

* * * * *